US010829385B2

(12) United States Patent
Matsumoto et al.

(10) Patent No.: US 10,829,385 B2
(45) Date of Patent: Nov. 10, 2020

(54) POSITIVE ELECTRODE ACTIVE MATERIAL FOR NONAQUEOUS SECONDARY BATTERIES, METHOD FOR PRODUCING SAME, AND NONAQUEOUS ELECTROLYTE SECONDARY BATTERY USING POSITIVE ELECTRODE ACTIVE MATERIAL

(75) Inventors: Satoshi Matsumoto, Ichikawa (JP); Shuhei Oda, Niihama (JP); Katsuya Inoue, Niihama (JP); Hiroyuki Toya, Niihama (JP)

(73) Assignee: SUMITOMO METAL MINING CO., LTD. (JP)

(*) Notice: Subject to any disclaimer, the term of this patent is extended or adjusted under 35 U.S.C. 154(b) by 0 days.

(21) Appl. No.: 14/122,276

(22) PCT Filed: May 30, 2012

(86) PCT No.: PCT/JP2012/064497
§ 371 (c)(1),
(2), (4) Date: Nov. 26, 2013

(87) PCT Pub. No.: WO2012/165654
PCT Pub. Date: Dec. 6, 2012

(65) Prior Publication Data
US 2014/0087263 A1    Mar. 27, 2014

(30) Foreign Application Priority Data
May 30, 2011  (WO) .................. PCT/JP2011/062863

(51) Int. Cl.
*C01D 15/02*      (2006.01)
*H01M 4/505*      (2010.01)
(Continued)

(52) U.S. Cl.
CPC ............. *C01D 15/02* (2013.01); *C01G 45/02* (2013.01); *C01G 45/1228* (2013.01);
(Continued)

(58) Field of Classification Search
CPC .................................. H01M 4/50; H01M 4/52
See application file for complete search history.

(56) References Cited

U.S. PATENT DOCUMENTS 6,255,020 B1* 7/2001 Yamashita ............ H01M 4/525
429/223
2003/0054251 A1    3/2003 Ohzuku et al.
(Continued)

FOREIGN PATENT DOCUMENTS

EP    0827223    3/1998
EP    1447866    8/2004
(Continued)

OTHER PUBLICATIONS

Deng et. al, Nanostructured Lithium Nickel Manganese Oxides for Lithium-Ion Batteries, Feb. 25, 2010, Journal of the Electrochemical Society, 157 (4), A447.-A452.*
(Continued)

*Primary Examiner* — Barbara L Gilliam
*Assistant Examiner* — Nathanael T Zemui
(74) *Attorney, Agent, or Firm* — Gerald E. Hespos; Michael J. Porco; Matthew T. Hespos

(57) ABSTRACT

Provided are a positive electrode active material for nonaguous secondary batteries, the material having a narrow particle-size distribution and a monodisperse property and being capable of increasing a battery capacity; an industrial production method thereof; and a nonaqueous secondary battery using the positive electrode active material and having excellent electrical characteristics. The positive electrode active material is represented by a general formula: $Li_{1+u}Ni_xCo_yMn_zM_tO_{2+\alpha}$ (wherein, $0.05 \leq u \leq 0.95$, $x+y+z+t=1$, $0 \leq x \leq 0.5$, $0 \leq y \leq 0.5$, $0.5 \leq z < 0.8$, $0 \leq t \leq 0.1$, and M is an additive element and at least one element selected from Mg, Ca, Al, Ti, V, Cr, Zr, Nb, Mo, and W), has an average particle diameter of 3 to 12 um, and has [($d_{90}-d_{10}$)/average
(Continued)

particle diameter], an index indicating a scale of particle-size distribution, of 0.60 or less.

9 Claims, 7 Drawing Sheets

(51) Int. Cl.
    *C01G 45/12* (2006.01)
    *C01G 51/00* (2006.01)
    *C01G 53/00* (2006.01)
    *C01G 45/02* (2006.01)
    *H01M 4/525* (2010.01)
    H01M 4/02 (2006.01)
    H01M 4/36 (2006.01)
    H01M 10/052 (2010.01)

(52) U.S. Cl.
    CPC ....... *C01G 45/1257* (2013.01); *C01G 51/006* (2013.01); *C01G 51/50* (2013.01); *C01G 53/006* (2013.01); *C01G 53/50* (2013.01); *H01M 4/505* (2013.01); *H01M 4/525* (2013.01); C01P 2002/52 (2013.01); C01P 2004/03 (2013.01); C01P 2004/10 (2013.01); C01P 2004/34 (2013.01); C01P 2004/51 (2013.01); C01P 2004/61 (2013.01); C01P 2006/40 (2013.01); H01M 4/366 (2013.01); H01M 10/052 (2013.01); H01M 2004/021 (2013.01)

(56) References Cited

U.S. PATENT DOCUMENTS

| | | |
|---|---|---|
| 2004/0234857 A1 | 11/2004 | Shiozaki et al. |
| 2006/0083989 A1 | 4/2006 | Suhara et al. |
| 2007/0160906 A1* | 7/2007 | Tooyama ............... H01M 4/362 429/223 |
| 2007/0292759 A1* | 12/2007 | Ugaji .................. H01M 4/131 429/223 |
| 2008/0102372 A1 | 5/2008 | Ohishi |
| 2009/0104530 A1 | 4/2009 | Shizuka et al. |
| 2009/0212267 A1* | 8/2009 | Dobbs ................. H01M 4/136 252/521.2 |
| 2010/0151332 A1 | 6/2010 | Lopez et al. |
| 2010/0209771 A1* | 8/2010 | Shizuka .............. B82Y 30/00 429/207 |
| 2011/0052981 A1* | 3/2011 | Lopez ............... C01G 45/1257 429/206 |
| 2011/0244324 A1* | 10/2011 | Jang .................... H01M 4/131 429/211 |
| 2012/0161069 A1 | 6/2012 | Nagai et al. |

FOREIGN PATENT DOCUMENTS

| | | |
|---|---|---|
| EP | 2006937 | 12/2008 |
| EP | 2 653 447 | 10/2013 |
| JP | 5-290832 | 11/1993 |
| JP | 10-162826 | 6/1998 |
| JP | 10-214624 | 8/1998 |
| JP | 10321227 A | 12/1998 |
| JP | 2003-86182 | 3/2003 |
| JP | 2004-193115 | 7/2004 |
| JP | 2004253174 A * | 9/2004 |
| JP | 2005-8461 | 1/2005 |
| JP | 2008-108574 | 5/2008 |
| JP | 2008147068 A * | 6/2008 |
| JP | 2008-305777 | 12/2008 |
| JP | 2009117241 A | 5/2009 |
| JP | 2010-192424 | 9/2010 |
| JP | 4915488 | 2/2012 |
| JP | 2005158624 A | 6/2015 |
| WO | 2004/092073 | 10/2004 |
| WO | 2011/027455 | 3/2011 |

OTHER PUBLICATIONS

JP2004253174A translation from Espacenet.*
JP2008147068A Original with Translation from Espacenet.*
JP2004253174A Original with Translation from Espacenet.*
International Search Report dated Aug. 28, 2012.
Naoaki Yabuuchi et al., "Koyoryo Li2MnO3-kei Koyotai Seikyoku Zairyo no Juhoden Hanno Kiko", The Electrochemical Society of Japan Taikai Koen Yoshishu, 77th, 2010, p. 37.
Yasuhiko Osawa et al., "Koyotai-kei Seikyoku (LiMnO3-LiM02) no Kozo to Hanno (1)", Abstracts, Battery Symposium in Japan, 50th, 2009, p. 14.
Yuichi Sato, "R&D of Solid Solution Cathode Materials for Lithium Ion Batteries", FP Technical News, No. 66, Jan. 2011, pp. 3-10.
"Cyclic deterioration and its improvement for Li-rich layered cathode material Li[Ni0.17Li0.2Co].07Mn0.56]O2", Journal of Power Sources, Elsevier SA, CH, vol. 195, No. 2, Jan. 15, 2010, pp. 567-573.
"In situ X-ray absorption spectroscopic study of Li-rich layered cathode material Li[NiLiCoMn]0", Journal of Power Sources, Elsevier SA, CH, vol. 196, No. 16, Sep. 29, 2010, pp. 6828-6834/.
English translation of the Non-patent reference (FB Technical News, No. 66, Jan. 2011).
Journal of Power Sources 183 (2008) 344-346—Atsushi Ito, Decheng Li, Yasuhiko Ohsawa, Yuichi Sato.

\* cited by examiner

POSITIVE ELECTRODE ACTIVE MATERIAL FOR NONAQUEOUS SECONDARY BATTERIES, METHOD FOR PRODUCING SAME, AND NONAQUEOUS ELECTROLYTE SECONDARY BATTERY USING POSITIVE ELECTRODE ACTIVE MATERIAL

BACKGROUND

1. Field of the Invention

The present invention relates to a positive electrode active material for nonaqueous secondary batteries, a method for producing the same, and a nonaqueous electrolyte secondary battery using the positive electrode active material.

2. Description of the Related Art

In recent years, with the spread of portable electronic equipment, such as cell, phones and notebook-sized personal computers, development of a small and lightweight non-aqueous electrolyte secondary battery having a high energy density has been strongly desired. Also, development of a high-output secondary battery as a battery for electric vehicles, such as hybrid vehicles, has been strongly desired.

As a secondary battery satisfying such demands, there is a lithium-ion secondary battery.

A lithium-ion secondary battery comprises a negative electrode, a positive electrode, an electrolyte solution, and the like, and, as active material of the negative electrode and the positive electrode, materials capable of desorption and insertion of lithium are used.

Currently, research and development of such lithium-ion secondary battery has been actively conducted, and particularly, since a 4V class high voltage can be achieved by a lithium-ion secondary battery using lithium metal composite oxide having a layered or spinel structure ac a positive electrode material, commercialization of the lithium-ion secondary battery as a battery having a high energy density is progressing.

As a material which has been mainly proposed until now, it may include lithium-cobalt composite oxide ($LiCoO_2$), which is relatively easily synthesized; lithium-nickel composite oxide ($LiNiO_2$), wherein nickel, which is more inexpensive than cobalt, is used; lithium-nickel-cobalt-manganese composite oxide ($LiNi_{1/3}Co_{1/3}Mn_{1/3}O_2$); lithium-manganese composite oxide ($LiMn_2O_4$), wherein manganese is used; lithium-nickel-cobalt-manganese composite oxide containing $Li_2MnO_3$; and the like.

Among these positive electrode active materials, lithium-excess nickel-cobalt-manganese composite oxide ($Li_2MnO_3$—$LiNi_xMn_yCo_zO_2$), which has a high capacity and excellent thermal stability, has been highlighted in recent years. Like lithium-cobalt composite oxide and lithium-nickel composite oxide, this lithium-excess nickel-cobalt-manganese composite oxide is a layered compound (See International Patent Application Laid-Open No. WO2004/092073).

Among such materials, composite oxide having a uniform and appropriate particle diameter as well as a high specific surface area is suitable so that performance to satisfy the above-mentioned demands is achieved.

When composite oxide having a large particle diameter and a low specific surface area is used, an area to react with an electrolyte solution cannot be sufficiently secured and thereby a sufficient capacity as a battery cannot be achieved. Also, when composite oxide having a wide particle-size distribution and containing fine particles, is used, a voltage applied to particles inside an electrode is uneven, thereby easily causing cycle degradation, such as selective degradation of said fine particles by repeated charge and discharge and causing the resulting decrease in capacity.

Hence, it is necessary to produce composite oxide having an appropriate particle diameter and a uniform particle-size distribution, and for that purpose, it is important to use composite hydroxide having a uniform particle-size distribution and to optimize production conditions.

Particularly, in the case of, for example, plug-in hybrid vehicles and electric vehicles using a large current, a smaller particle-size distribution is preferable in order to reduce resistance and increase contact surface with an electrolyte solution.

For a method of producing the above-mentioned compound hydroxide, various proposals have been made until, now.

For example, International Patent Application Laid-Open No. WO2004/092073 discloses that a nickel-cobalt-manganese salt solution, an alkali-metal-hydroxide solution, and an ammonium ion supply source each are supplied to a reaction system continuously or intermittently, and with setting a temperature of the reaction system at a constant value within a range of 30 to 70 degrees C. and maintaining a pH at an almost constant value within a range of 10 to 13, a reaction is made to proceed to synthesize nickel-cobalt-manganese composite hydroxide particles.

Japanese Patent Application Laid-Open No. H10-214624 discloses that, in a method of producing a positive electrode active material for lithium secondary batteries, with using a reaction vessel, a composite metal salt solution obtained by dissolving a salt of each composition element of the above-mentioned material in water thereby to adjust a salt concentration; a water-soluble complexing agent to form metal ions and a complex salt; and a lithium, hydroxide solution each are continuously fed into the reaction vessel to form a composite metal complex salt, and then this complex salt is decomposed by lithium hydroxide to precipitate a lithium-coprecipitated composite metal salt, and, while such formation and decomposition of complex salt is circulated in the vessel, a lithium-coprecipitated composite metal salt is repeatedly made to overflow and taken out, whereby a lithium-coprecipitated composite metal salt having an approximately spherical particle shape is synthesized.

These methods are suitable for producing high-density particles, but it cannot be said that particle growth is sufficiently controlled, and particularly, in a continuous crystallization method, a particle-size distribution is a normal distribution and thereby is easily spread, and accordingly it is hard to say that the method is suitable to obtain particles having an almost uniform particle diameter.

Japanese Patent Application Laid-Open No. 2003-86182 proposes a method of producing a positive electrode active material for nonaqueous electrolyte batteries, wherein a solution containing two or more kinds of transition metal salts or two or more kinds of solutions each containing a different, transition metal salt, and an alkaline solution are simultaneously fed into a reaction vessel and coprecipitated while a reducing agent is made to coexist therewith or inert gas is flown thereinto, whereby hydroxide or oxide as a precursor is obtained.

This method itself aims to control imperfect solid-dissolution at an atomic level and does not control a particle diameter, but there is disclosed a device to obtain spherical hydroxide or oxide having a high density and a large particle diameter. This device has a system, wherein a mixture of solutions is made to flow from downward to upward, and crystal particles whose specific gravity is increased due to a certain level of crystal development precipitate and reach a collection portion in a lower part of the device, while underdeveloped crystal particles are put back by the power of the solutions flown from the lower part, and thereby do not fall to the lower part.

This device aims to classify and collect formed crystals and thereby obtain crystal particles having a large particle diameter, but, in order to form and obtain a product having a uniform particle diameter, it is necessary to strictly control production conditions, and a problem is likely to be caused in an industrial scale production. Furthermore, particle-size distribution of an obtained composite hydroxide or a positive electrode active material is not disclosed in Examples, and the effect is not clear.

In order to provide a high output of a battery, it is effective to increase a reaction area without changing a particle diameter. In other words, porous particles or a hollow particle structure allows a surface area which contributes to a battery reaction to be increased and allows reaction resistance to be reduced.

For example, Japanese Patent No. 4915488 discloses positive electrode active material for nonaqueous electrolyte secondary batteries, the positive electrode active material comprising lithium-nickel-manganese composite oxide composed of hexagonal lithium-containing composite oxide having a layered structure; having an average particle diameter of 2 to 8 µm; having not more than 0.60 of [(d90−d10)/ average particle diameter], which is an index indicating a scale of particle-size distribution; having a hollow structure comprising an outer shell portion in which aggregated primary particles are sintered and a hollow portion which is present inside the outer shell portion. Also, Patent Literature 4 discloses that the production method thereof is easy and suitable for large scale production, and the positive electrode active material for nonaqueous electrolyte secondary batteries can reduce a value of positive electrode resistance which is measured when the material is used for a nonaqueous electrolyte secondary battery, and the material has a high capacity and a good cycle characteristic, whereby high output is achieved.

However, although the positive electrode active material disclosed in Japanese Patent No. 4915488 has a high capacity, further higher energy density has been desired. Also, further higher output performance has been desired.

As a method for achieving the above-mentioned higher output performance, addition of different elements is applied, and particularly, it is supposed that high-valent transition metals, such as W, Mo, Nb, Ta, and Re, are useful.

For example, Japanese Patent Application Laid-Open No. 2008-305777 proposes lithium transition metal compound powder for use as a positive electrode material, for lithium secondary batteries, the lithium transition metal compound powder containing, as a main component raw material, a lithium transition metal compound having a function capable of insertion and desorption of lithium ions; and being obtained in such a manner that one or more kinds of additives to control particle growth and sintering at the time of burning are added to said main component raw material at a ratio of not less than 0.01 mol % and less than 2 mol % with respect to a total molar amount of transition metal elements in the main component raw material and then burned. Japanese Patent Application Laid-Open No. 2008-305777 also discloses oxide containing at least one element, selected from the group consisting of Mo, N, Nb, Ta, and Re, as the additive.

Japanese Patent Application Laid-Open No. 2008-305777 describes that, in this lithium transition metal compound powder, an atomic ratio of a total of the above-mentioned additive elements to a total of Li and metallic elements other than said additive elements on the surface of primary particles is five or more times than said atomic ratio in the whole of particles, and thereby improvement in load characteristics, such as rate and output characteristics, cost reduction, and achievement of both high withstand voltage and high safety can be realized. However, in the lithium transition metal compound powder, although an output characteristic thereof is improved, it, is hard to say that higher capacity and improvement, in cycle characteristic are sufficiently achieved.

Non Patent Literature 1: FB technical news, No. 66, January 2011

In view of such problems, the present invention aims to provide a positive electrode active material for nonaqueous secondary batteries with an industrial production method thereof, the positive electrode active material having a uniform particle-size distribution, being capable of improving capacity and cycle characteristics when used for batteries, and furthermore capable of achieving higher output. Further, the present invention aims to provide a nonaqueous secondary battery comprising such positive electrode active material and being excellent in electrical characteristics.

SUMMARY OF THE INVENTION

In order to solve the above-mentioned problems, the inventors earnestly studied an impact of lithium-nickel-cobalt-manganese composite oxide on battery characteristics, and then found that, when lithium-nickel-cobalt-manganese composite oxide having a specific lithium content and a narrow particle-size distribution was used as a positive electrode active material, battery characteristics were considerably improved; and when nickel-cobalt-manganese composite hydroxide having a narrow particle-size distribution and obtained by separating nucleation and particle growth at a crystallization process was mixed with a lithium compound at a specific ratio to burn the mixture, the above-mentioned lithium-nickel-cobalt-manganese composite oxide was obtained, and thus they accomplished the present invention.

More specifically, a first aspect of the present invention is to provide a positive electrode active material for nonagueous electrolyte secondary batteries, the positive electrode active material comprising lithium metal composite oxide represented by a general formula: $Li_{1+u}Ni_xCo_yM_nM_tO_{2+\alpha}$ (wherein, $0.05 \leq u \leq 0.95$, $x+y+z+t=1$, $0 \leq x \leq 0.5$, $0 \leq y \leq 0.5$, $0.5 \leq z < 0.8$, $0 \leq t \leq 0.1$, and M is an additive element and is at least one element selected from Mg, Ca, Al, Ti, V, Cr, Zr, Nb, Mo, and W) and composed of hexagonal lithium-containing composite oxide having a layered structure, wherein the positive electrode active material has an average particle diameter of 3 to 12 µm and $[(d_{90}-d_{10})/$ average-particle-diameter], an index indicating a scale of particle-size distribution, of not more than 0.60.

A second aspect of the present invention is to provide the positive electrode active material for nonagueous electrolyte secondary batteries, wherein the lithium metal composite oxide according to the first aspect is represented by a general formula: $bLi_2MnM1t1O_3 \cdot (1-b)Li1+VNixCoyMnzM2t2O2$ (wherein, $0.2 \leq b \leq 0.7$, $-0.05 \leq v \leq 0.20$, $t1+t2=t$, $x+y+z+t=1$, $0.1 \leq x \leq 0.4$, $0.2 \leq y \leq 0.8$, $0.1 \leq z \leq 0.4$, $0 \leq t \leq 0.1$, and each of M1 and M2 is an additive element and is at least one element selected from Mg, Ca, Al, Ti, V, Cr, Zr, Nb, Mo, and W).

A third aspect of the present invention is to provide the positive electrode active material for nonaqueous electrolyte secondary batteries, wherein the general formula according to the first aspect is expressed as $Li_{1+s}Ni_xCo_yMn_zM_tO_{2+\alpha}$ (wherein, $0.40 \leq s < 0.60$, $z-x \leq s$ when $z-x > 0.4$, $s \leq z$ when $z < 0.6$, $0 \leq x \leq 0.5$, $0 \leq y \leq 0.5$, $0.5 \leq z < 0.8$, $0 < x+y$, $x+v+z+t=1$, $z-x < 0.6$, and $0.4 \leq \alpha < 0.6$).

A fourth aspect of the present invention is to provide the positive electrode active material for nonaqueous electrolyte secondary batteries, wherein, when she general formula according to the third aspect is expressed as $sLi_2MnM1_{t1}O_3 \cdot (1-s)LiNM2_{t2}O_2$ (wherein, N is at least one selected from Ni, Co, and Mn, but always includes Ni or Co), a ratio of $Li_2MnO_3:LiNO_2$ is 0.40:0.60 to 0.55:0.45.

A fifth aspect of the present invention is to provide the positive electrode active material for nonaqueous electrolyte secondary batteries, wherein a ratio of Ni to Mn (Ni/Mn) contained in the $LiNO_2$ according to the fourth aspect is from 0.8 to 1.2.

A sixth aspect of the present invention is to provide the positive electrode active material for nonaqueous electrolyte secondary batteries, wherein the lithium metal composite oxide according to the first to fifth aspects comprises primary particles and secondary particles composed of aggregation of the primary particles, and has a compound layer having a layer thickness of not more than 20 nm and containing lithium and condensed tungsten in a surface or a particle boundary of the lithium metal composite oxide.

A seventh aspect of the present invention is so provide the positive electrode active material for nonaqueous electrolyte secondary batteries, wherein an amount of tungsten contained in the compound layer according to the sixth aspect is 0.1 to 3.0 atom % in terms of a number of tungsten atoms with respect to a total number of atoms of metal elements, other than lithium, contained in the lithium metal composite oxide.

An eighth aspect of the present invention is to provide the positive electrode active material for nonaqueous electrolyte secondary batteries, wherein the lithium metal composite oxide according to the first to seventh aspects has a hollow structure comprising an outer shell portion with aggregated primary particles sintered and a hollow portion being inside the outer shell portion.

A ninth aspect of the present invention is to provide the positive electrode active material for nonaqueous electrolyte secondary batteries, wherein the positive electrode active material comprising the lithium metal composite oxide according to the first to eighth aspects has an average particle diameter of 3 to 8 μm.

A tenth aspect of the present invention is to provide the positive electrode active material for nonaqueous electrolyte secondary batteries according to the first to ninth aspects, wherein the positive electrode active material has an initial discharge capacity of not less than 220 mAh/g when used for a 2032 type coin battery as a positive electrode active material.

An eleventh aspect of the present invention is to provide a method of producing the positive electrode active material for nonaqueous electrolyte secondary batteries according to the first to tenth aspects, the method comprising: a first step of obtaining manganese composite hydroxide particles by separating a nucleation stage and a particle growth stage the manganese composite hydroxide particles being manganese composite hydroxide represented by a general formula $Ni_xCo_yMn_zM_t(OH)_{2+a}$ (wherein, $x+y+z+t=1$, $0 \leq x \leq 0.5$, $0 \leq y \leq 0.5$, $0.5 \leq z < 0.8$, $0 \leq t \leq 0.1$, $0 \leq a \leq 0.5$, and M is an additive element and is at least one element selected from Mg, Ca, Al, Ti, V, Cr, Zr, Nb, Mb, and W) and having an average particle diameter of 3 to 12 μm, and further having [(d90−d10)/average-particle-diameter], an index indicating a scale of particle-size distribution, of not more than 0.55, wherein the nucleation stage is such that a solution containing at least a manganese compound and a solution containing an ammonium ion supply source are fed into a reaction vessel to make a reaction solution, and sodium hydroxide solution is also fed thereinto with adjusting an addition amount thereof in order to maintain the above-mentioned reaction solution in the reaction vessel at a predetermined pH, and then a pH of the reaction solution is controlled to 12.0 to 14.0 at a reference solution temperature of 25 degrees C. to form nuclei, and the particle growth stage is such that a pH of the reaction solution is controlled to 10.5 to 12.0 at a reference solution temperature of 25 degrees C. to be lower than the pH at the nucleation stage, whereby the nuclei formed in said nucleation stage is grown; a second step of heat-treating the manganese composite hydroxide particles obtained in the first step at 105 to 750 degrees C.; and a third step of obtaining a lithium metal composite oxide in such a manner that a lithium compound is added to the manganese composite hydroxide after the heat treatment, the manganese composite hydroxide before the heat treatment, or a mixture thereof so as to achieve a ratio of Li/Me of from 1.05 to 1.95, the Li being a number of lithium atoms, the Me being a total number of atoms of metal elements other than lithium, whereby a lithium mixture is formed, and the formed lithium mixture is burned at a temperature of 000 to 1050 degrees C. in an oxidizing atmosphere and then pulverized.

A twelfth aspect of the present invention is to provide the method of producing the positive electrode active material for nonaqueous electrolyte secondary batteries in the sixth to tenth aspects, wherein, when the lithium compound is added to form a lithium mixture according to the eleventh aspect, a tungsten compound is also mixed therewith.

A thirteenth aspect of the present invention is to provide the method of producing the positive electrode active material for nonaqueous electrolyte secondary batteries, wherein an average diameter of secondary particles of the above-mentioned manganese composite hydroxide is five or more times than an average diameter of primary particles of the tungsten compound mixed when the lithium mixture is formed according to the twelfth aspect.

A fourteenth aspect of the present invention is to provide the method of producing the positive electrode active material for nonaqueous electrolyte secondary batteries, wherein the first step according to the eleventh to thirteenth aspects includes: a nucleation stage to form nuclei in an oxidizing atmosphere having an oxygen concentration of more than 1% by volume in an inner space of the reaction vessel; and a particle growth stage to grow the nuclei by switching from the oxidizing atmosphere to a mixed atmosphere of oxygen and inert gas having an oxygen concentration of not more than 1% by volume at a point in time when 0 to 40% of a total time of the particle growth stage has passed since the particle growth stage is started.

A fifteenth aspect of the present invention is to provide the method of producing the positive electrode active material for nonaqueous electrolyte secondary batteries, wherein, in the first step according to the eleventh, to fourteenth aspects, nucleation stage and the particle growth stage are separated in such a manner that composite hydroxide particles are formed in advance as nuclei by controlling a pH value to 12.0 to 14.0 at a reference solution temperature of 25 degrees C. and added as seed crystals to a reaction solution, and then a pH value of the reaction solution is controlled to 10.5 to 12.0 at a reference solution temperature of 25 degrees C. to grow said particles.

A sixteenth aspect of the present, invention is to provide the method of producing the positive electrode active material for nonagueous electrolyte secondary batteries, wherein, in the first step according to the eleventh to fifteenth aspects, a part of a post-reaction solution is discharged out of the reaction vessel after the nucleation or during the particle growth stage thereby to increase a concentration of the composite hydroxide particles in the reaction vessel, and then particle growth continues to be performed.

A seventeenth aspect of the present invention is to provide the method of producing the positive electrode active material for nonaqueous electrolyte secondary batteries, wherein, in the first step according to the eleventh to sixteenth aspects, the reaction solution is controlled to have an arbitrary temperature within a range of not less than 35 degrees C. and not more than 60 degrees C.

An eighteenth aspect of the present invention is to provide the method of producing the positive electrode active material for nonaqueous electrolyte secondary batteries, wherein, in the first step according to the eleventh to seventeenth aspects, an ammonia concentration of the reaction solution is maintained at an arbitrary constant value within a range of 3 to 25 g/L.

A nineteenth aspect of the present invention is to provide the method of producing the positive electrode active material for nonaqueous electrolyte secondary batteries, wherein the manganese composite hydroxide obtained in the particle growth, stage according to the eleventh to eighteenth, aspects is coated with a compound containing at least one additive element selected from additive elements M (Mg, Ca, Al, Ti, V, Cr, Zr, Nb, Mb, and W).

A twentieth aspect of the present invention is to provide the method of producing the positive electrode active material for nonaqueous electrolyte secondary batteries, wherein, in the burning in the third step according to the eleventh to nineteenth aspects, calcination is performed in advance at a temperature of 350 to 800 degrees C. that is lower than the temperature of the burning.

A twenty-first aspect or the present invention is to provide a nonaqueous electrolyte secondary battery, comprising a positive electrode including the positive electrode active material for nonaqueous electrolyte secondary batteries according to the first to tenth aspects, as an active material.

The present invention makes it possible to obtain a positive electrode active material for nonaqueous secondary batteries which has a narrow particle-size distribution and a monodisperse property, and so obtain a nonaqueous electrolyte secondary battery having a high discharge capacity by constituting the battery with the use of the above-mentioned positive electrode active material.

Also, the present invention makes it possible to achieve low resistance and thereby to obtain a nonaqueous electrolyte secondary battery capable of realizing high output.

Furthermore, the method of producing a positive electrode active material for nonaqueous electrolyte secondary batteries according to the present invention is easy and suitable for mass production, and provides industrially remarkable effects.

DETAILED DESCRIPTION OF THE PREFERRED EMBODIMENTS

Figure 1:
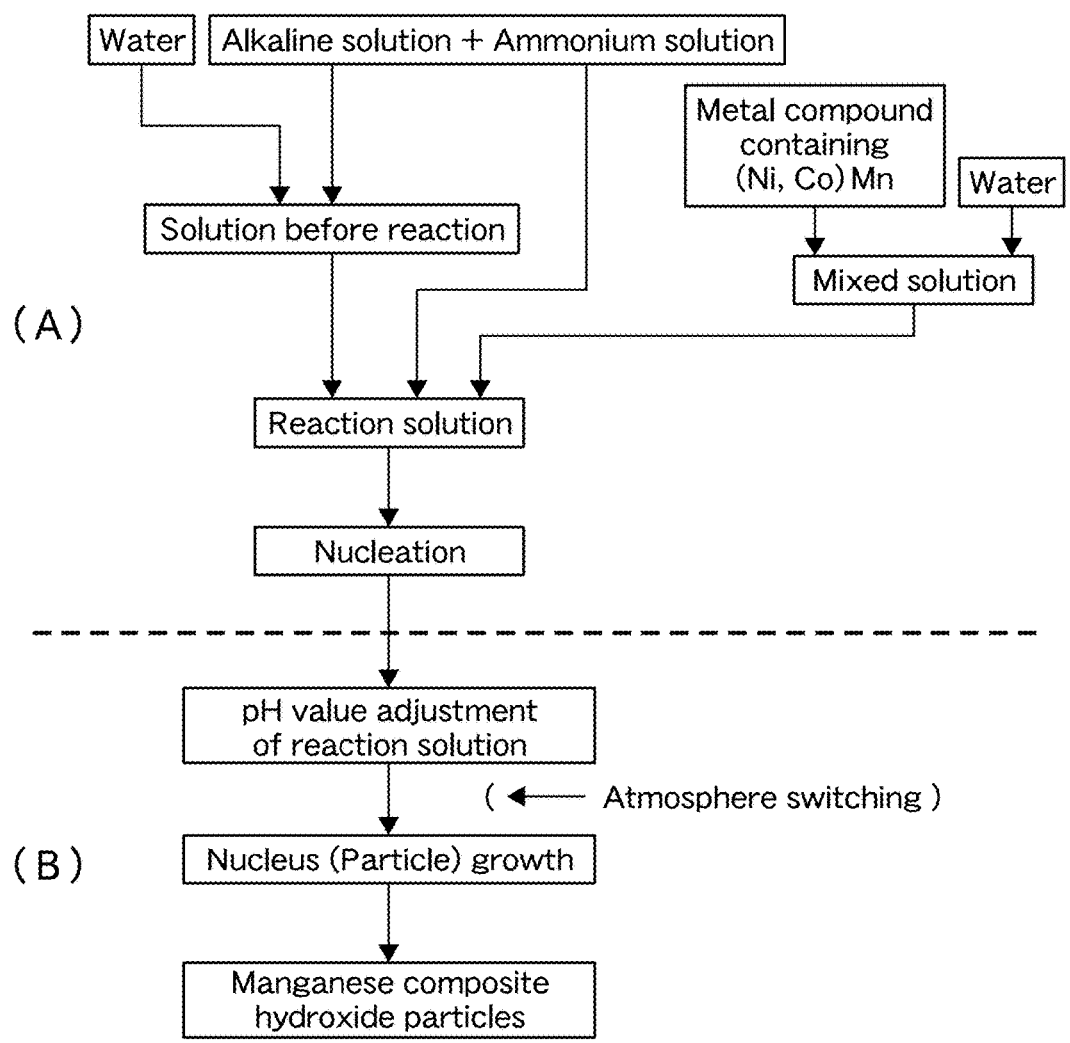
FIG. 1 is a schematic flow chart showing a production process of manganese composite hydroxide particles in the first step.

Hereinafter, there will be explained in detail a positive electrode active material for nonaqueous electrolyte secondary batteries according to the present invention and a manufacturing method of the positive electrode active material, and then a nonaqueous electrolyte secondary battery according to the present invention will be explained.

(1) Positive Electrode Active Material for Nonaqueous Electrolyte Secondary Batteries A positive electrode active material for nonaqueous electrolyte secondary batteries according to the present invention comprises lithium metal composite oxide represented by a general formula: $Li_{1+u}Ni_xCo_yMn_zM_tO_{2+\alpha}$ (wherein, $0.5 \le u \le 0.95$, $x+y+z+t=1$, $0 \le x \le 0.5$, $0 \le y \le 0.5$, $0.5 \le Z < 0.8$, $0 \le t \le 0.1$, and M is an additive element and at least one element selected from Mg, Ca, Al, Ti, V, Cr, Zr, Nb, Mo, and W) and composed of hexagonal lithium-containing composite oxide having a layered structure, wherein an average particle diameter thereof is 3 to 1.2 μm, and $[(d_{90}-d_{10})/$ average-particle-diameter], an index indicating a scale of particle-size distribution, is not more than 0.60.

Such a composition ratio which is a ratio of the number of atoms of metal elements other than lithium to a total of Li and the metal elements other than lithium in this general formula (hereinafter, sometimes referred to as a ratio Li/Me) has a large impact on an initial discharge capacity of a battery, and thus a composition ratio when represented as the above-mentioned general formula makes it possible to obtain a battery having a high capacity. This might be because, depending on said composition ratio, a proportion to form Li2MnO3 which contributes to achieve a higher capacity is changed.

The reason why such high capacity can be obtained is presumed as follows.

The presence of LiMO2, which is a layered compound and causes charge and discharge reactions by insertion and removal of Li, in the circumference allows the reactions by insertion and removal of Li to be accelerated even in Li2 MnO3, which is usually unlikely to cause the reactions by insertion and removal of Li, whereby battery capacity is increased. Hence, in view of theoretical capacity, it is supposed that a higher proportion of Li2MnO3 leads to a higher discharge capacity, but, when a proportion of $Li_2MnO_3$ is too high, less $LiMO_2$ is present in the circumference of $Li_2MnO_3$, and thereby the above-mentioned acceleration effect of Li insertion and removal is reduced and then inert $Li_2MnO_3$ is increased, whereby a battery capacity is reduced. Furthermore, in order to enhance the acceleration effect, more contact interfaces between $Li_2MnO_3$ and $LiMO_2$ are advantageous, and a structure in which $Li_2MnO_3$ and $LiMO_2$ are finely intermingled with each other is preferable.

In the above-mentioned general formula, when "u", which indicates an excessive amount of Li, is increased, the presence of Li2MnO3 is increased and thereby increasing a battery capacity. Therefore, it is necessary to make u not less than 0.05. When u is less than 0.05, the presence of $Li_2MnO_3$ is decreased, whereby a sufficient battery capacity cannot be obtained. On the other hand, when u exceeds 0.95, activity fails extremely, accordingly it is impossible to produce electricity, whereby an initial discharge capacity of a positive electrode active material is decreased and reaction resistance of a positive electrode is increased.

The lithium metal composite oxide is preferably represented by a general formula: $bLi_2MnM^1_{t1}O_3 \cdot (1-b)Li_{1+v}Ni_xCo_yMn_xM^2_{t2}O_2$ (wherein, $0.2 \leq b \leq 0.7$, $-0.05 \leq v \leq 0.20$, $t1+t2=t$, $x+y+z+t=1$, $0.1 \leq x \leq 0.4$, $0.2 \leq y \leq 0.8$, $0.1 \leq z \leq 0.4$, $0 \leq t \leq 0.1$, and each of $M^1$ and $M^2$ is an additive element and is at least one element selected from Mg, Ca, Al, Ti, V, Cr, Zr, Nb, Mo, and W).

Here, when v is less than −0.05, a positive electrode in a nonaqueous electrolyte secondary battery including the obtained positive electrode active material has higher reaction resistance, and therefore battery output is reduced. On the other hand, when v is more than 0.20, an initial discharge capacity in the case of using the positive electrode active material for a positive electrode of a battery is decreased and also reaction resistance of the positive electrode is increased. Hence, in order to reduce the reaction resistance still further, v is preferably not less than 0.05 and not more than 0.15.

It is more preferable that, as represented by the above-mentioned general formula, the positive electrode active material according to the present invention is adjusted so as to contain the additive element in lithium metal compound oxide particles. By making the additive element contained, a durable characteristic and an output characteristic of a battery which uses the positive electrode active material according to the present invention as a positive electrode active material can be improved.

Particularly, by uniformly distributing the additive element over the surface or the inside of the particles, the above-mentioned effect can be achieved in the whole of the particles, and thus only a small amount addition thereof makes it possible to obtain such effects and to control reduction in capacity.

Furthermore, in order to achieve the effect with a smaller amount addition thereof, it is preferable to make a concentration of the additive element on the surface of the particles higher than that inside the particles.

When an atomic ratio t of an additive element M to all the atoms is more than 0.1, metal elements which contribute to a Redox reaction are decreased, and accordingly a battery capacity is reduced, which is not preferable. Therefore, the additive element M is adjusted so that the atomic ratio t is within the above-mentioned range.

The lithium metal composite oxide is preferably represented by a general formula: $Li1+sNixCoyMnzMtO2+\alpha$ (wherein, $0.40 \leq s < 0.60$ ($z-x \leq s$ when $z-x>0.4$, $s \leq z$ when $z<0.6$), $0 \leq x \leq 0.5$, $0 \leq y \leq 0.5$, $0.5 \leq z < 0.8$, $0 < x+y$, $x+y+z+t=1$, $z-x<0.6$, $0.4 \leq \alpha < 0.6$).

Here, when an excessive amount of Mn with respect to Ni, that is, "z−x" is more than 0.4, s needs to be not less than (z−x). When s is less than (z−x), an amount of Li2 MnO3 formed is decreased, thereby reducing a battery capacity. Also, when z, which represents an amount of Mn, is less than 0.6, if an amount of Li exceeds the amount of Mn, Mn and excess Li which does not form Li2MnO3 are increased, thereby reducing a battery capacity.

At least one of Ni and Co is preferably contained, and x, which represents an amount of Ni, is $0 \leq x \leq 0.5$ while y, which represents an amount of Co, is $0 \leq y \leq 0.5$. When any of x and y is more than 0.5, an amount of Li2MnO3 formed is decreased, thereby reducing a battery capacity. On the other hand, when both x and y are 0, LiMO2 is not formed, whereby a battery capacity is reduced.

Further, z, which represents an amount of Mn, is $0.5 \leq z < 0.8$, and when z is less than 0.5, Li2MnO3 is no sufficiently formed and also unreacted Li is present, whereby battery characteristics are reduced. On the other hand, when z is not less than 0.8, Li necessary to form Li2MnO3 and LiMO2 runs short, and accordingly a spinel phase as LiNi0.5Mn1.5O4 is formed, whereby battery characteristics are reduced. In order to control formation of such a spinel phase, this (x−z) is preferably not more than 0.6.

Furthermore, α in the general formula represents a value indicating an excessive amount of O (oxygen), and needs to be within the same value range as s in order to form Li2MnO3 and LiMO2.

As mentioned above, in view of theoretical capacity, it is supposed that a higher proportion of Li2MnO3 leads to a higher discharge capacity, but, the inventors studied in detail an impact of the above-mentioned composition ratio on battery capacity, and, as a result, obtained a view that, in the case where the above-mentioned general formula is expressed as sLi2MnO3·(1·s)LiMO2 (wherein, M is at least one selected from Ni, Co, and Mn, but always includes Ni or Co), when a ratio of Li2MnO3 to LiMO2 is approximately 0.5 to 1, a discharge capacity tends to be larger.

Particularly, a composition in which a ratio of Li2MnO3 to LiMO2 is 0.5 to 1 and a ratio of Ni to Mn in a remaining layered compound is 1 to 1 effectively demonstrates the highest capacity. When a ratio of Ni to Mn in the layered compound LiMO2 is 1 to 1, Ni is divalent while Mn is tetravalent, and thus an average thereof is trivalent. It is supposed that the presence of a pair of such Ni (divalent) and Mn (tetravalent) allows the reactions by insertion and removal of Li in Li2MnO3, which usually does not contribute to charge and discharge, to be caused more easily.

Therefore, in the above-mentioned positive electrode active material, when the general formula is expressed as sLi2MnO3·(1-s)LiMO2, a ratio of Li2MnO3:LiMO2 is preferably 0.40:0.60 to 0.55:0.45. Furthermore, a ratio of Ni:Mn (Ni/Mn) contained in said LiMO2 is preferably from 0.8 to 1.2.

The lithium metal composite oxide comprises primary particles and secondary particles composed of aggregation of the primary particles, and has a compound layer which contains lithium and condensed tungsten in a surface or a particle boundary of the lithium metal composition oxide, and an layer thickness of the compound layer is preferably not more than 20 nm.

Generally, when a surface of a positive electrode active material is completely coated with a different kind of compound, movement of lithium ions (intercalation) is greatly restricted, and, as a result, an advantage of a high capacity which lithium-nickel composite oxide has is canceled. However, in the present invention, there is formed a compound layer which is composed of fine particles containing W and Li on a surface of a lithium metal composite oxide powder, and the fine particles have high lithium-ion conductivity and are effective in accelerating the movement of lithium ions. Thus, by forming said compound layer in a surface of lithium metal composite oxide powder, a conduction path of Li is formed at an interface with an electrolyte solution, whereby reaction resistance of the active material is reduced to improve an output characteristic.

Here, when a surface of a positive electrode active material is coated with a layered material, regardless of a coating thickness thereof, a specific surface area is decreased, and therefore, even if the coated material has a high lithium ion conductivity, a contact area with an electrolyte solution is smaller, whereby decrease in charge-and-discharge capacity and increase in reaction resistance are easily caused. However, the formation with the fine particles according to the present invention allows a contact area with an electrolyte solution to be made large enough to effectively improve lithium ion conductivity, and therefore, decrease in charge-and-discharge capacity can be controlled, and also increase in reaction resistance can be reduced.

Such fine particles preferably have a primary particle diameter of not more than 20 nm, which is the upper limit of the layer thickness. When the primary particle diameter is more than nm, coating by one fine particle is too thick, whereby a compound layer is hard to be formed, and besides, more voids are formed, and accordingly resistance is increased.

When the particle diameter is less than 1 nm, the fine particles sometimes do not have sufficient lithium-ion conductivity.

Furthermore, since the contact with an electrolyte solution takes place on surfaces of the primary particles, it is important that fine particles are formed on the surfaces of the primary particles. Here, the surfaces of the primary particles according to the present invention include surfaces of primary particles exposed at an external surface of a second particle, and surfaces of primary particles exposed in a vicinity of a second particle surface and in an internal void of a second particle where an electrolyte solution is capable of permeating via an exterior of the secondary particle. Furthermore, if binding of the primary particles is imperfect so that an electrolyte solution is capable of permeating, even a particle boundary between the primary particles is included in the surfaces.

The contact with an electrolyte solution takes place not only on an external surface of a secondary particle composed of aggregation of primary particles, but also in a vicinity of a second particle surface and in an internal void of the second particle, and furthermore takes place in the imperfect particle boundary as mentioned above, and therefore it is necessary to form fine particles also on surfaces of the primary particles and to accelerate movement of lithium ions.

Thus, by forming the fine particles on the whole surface of the primary particles, reaction resistance of lithium metal composite oxide particles can be further reduced.

Here, the fine particles need not be completely formed on all the surfaces of the primary particles, and may be interspersed thereon. Even in a state of such interspersion, when the fine particles are formed on the surfaces of the primary particles exposed on an outer surface and an internal void of a lithium metal composite oxide particle, reduction effect in reaction resistance is achieved.

Properties of a surface of such lithium metal composite oxide powder can be determined, for example, by observing with a field emission scanning electron microscope, and it has been confirmed that, in a positive electrode active material for nonaqueous electrolyte secondary batteries according to the present invention, fine particles containing W and Li are formed on a surface of powder made of lithium metal composite oxide.

On the other hand, in the case where the fine particles are unevenly formed between lithium metal composite oxide powders, movement of lithium ions between the lithium metal composite oxide powders is uneven, and therefore, load is applied to specific lithium metal composite oxide powder, and thereby deterioration in cycle characteristic and increase in reaction resistance tend to be easily caused.

Hence, it is preferable that fine particles are uniformly formed even between lithium metal composite oxide powders.

The fine particles according to the present invention only have to contain tungsten and lithium, but preferably, tungsten and lithium are contained in a form of lithium tungstate. The formation of lithium tungstate allows lithium ion conductivity to be further increased, and reduction effect in reaction resistance to be further improved.

An amount of tungsten contained in the compound layer is preferably 0.1 to 3.0 atom % with respect to a total number of atoms of metal elements, other than lithium, contained in lithium metal composite oxide. This makes it possible to achieve both a high charge-and-discharge capacity and an output characteristic.

when an amount of tungsten is less than 0.1 atom %, a path to improve lithium ion conductivity is not sufficiently secured in particle boundaries on the surface and in the inside. When an amount of tungsten is more than 3.0 atom %, a sintering preventive effect of tungsten proceeds, and thereby primary particles to form secondary particles become too small, whereby to many particle boundaries, which develop resistance, are produced, and besides, a fixed layer thickness of the compound layer cannot be maintained and thereby an layer thickness thereof exceeds 20 nm and resistance is increased again, and thus a discharge capacity may be decreased.

An amount of lithium contained in the compound layer is not particularly limited, and, when the compound layer contains any amount of lithium, an improvement effect of lithium ion conductivity is obtained, but an amount of lithium enough to form lithium tungstate is preferable.

Furthermore, a particle size characteristic of the positive electrode active material according to the present invention is also important.

That is, the positive electrode active material has an average particle diameter of 3 to 12 µm, preferably 3 to 8 µm, more preferably 3 to 7 µm, and has [(d90−d10)/average-particle-diameter], an index indicating a scale of particle-size distribution, of not more than 0.6, preferably not more than 0.55, whereby an unprecedented high energy density can be achieved.

When the positive electrode active material has an average particle diameter of less than 3 µm, filling density of particles is lowered at the time of the formation of a positive electrode and thereby a battery capacity per volume of the positive electrode is reduced. On the other hand, when the positive electrode active material has an average particle diameter of more than 12 µm, a specific surface area of the positive electrode active material is decreased to reduce an interface with an electrolyte solution of a battery, whereby resistance of a positive electrode is increased to reduce an output characteristic of a battery. Also, since the above-mentioned composite oxide is basically a conductive low material, a discharge capacity which can be produced is decreased.

Additionally, when a particle size distribution is wide-ranging, many particles whose particle diameter is considerably small with respect to an average particle diameter and many coarse particles whose particle diameter is considerably large with respect to the average particle diameter are present in the positive electrode active material.

Therefore, although the positive electrode active material according to the present invention is a material excellent in thermal stability in view of the composition thereof, if many fine particles are present in the positive electrode active material, the positive electrode active material could generate heat due to local reactions of the fine particles in the positive electrode of a battery, whereby thermal stability is decreased. Also, since the fine particles selectively degrade, a cycle characteristic is worsened.

On the other hand, if many coarse particles are present, due to influence of the above-mentioned low conductivity, discharge capacity which can be secured is decreased.

Therefore, when [(d90−d10)/average-particle-diameter], the index indicating a particle-size distribution of the positive electrode active material, is controlled to be not more than 0.6, a battery using said positive electrode active material can have a high capacity and a good cycle characteristic.

Note that, in [(d90−d10)/average-particle-diameter], the index indicating a scale of a particle-size distribution, d10 represents a particle diameter obtained at the point in time when an accumulated volume reaches 10% of a total volume of all the particles when the number of particles in each particle diameter is accumulated in the order from small particle diameter. On the other hand, d90 represents a particle diameter obtained at the point in time when an accumulated volume reaches 90% of a total volume of all the particles when the number of particles in each particle diameter is accumulated in the order from small particle diameter.

Methods of calculating an average particle diameter, d90, and d10 are not particularly limited, but, for example, they can be obtained from an integrated value of volume measured with a laser diffraction scattering type particle-size analyzer. In the case where d50 is used as an average particle diameter, as is the case with d90, there may be used a particle diameter obtained at the point in time when an accumulated volume reaches 50% of a total volume of all the particles.

Therefore, when the positive electrode active material according to the present invention is controlled to have the above-mentioned particle-size distribution and to have an average particle diameter of 3 to 12 μm, preferably 3 to μm, more preferably 3 to 7 μm, still more preferably 3 to 6.5 μm, in the case where said positive electrode active material is used for positive electrode of a battery, a large battery capacity and excellent battery characteristics can be achieved.

Figure 8:
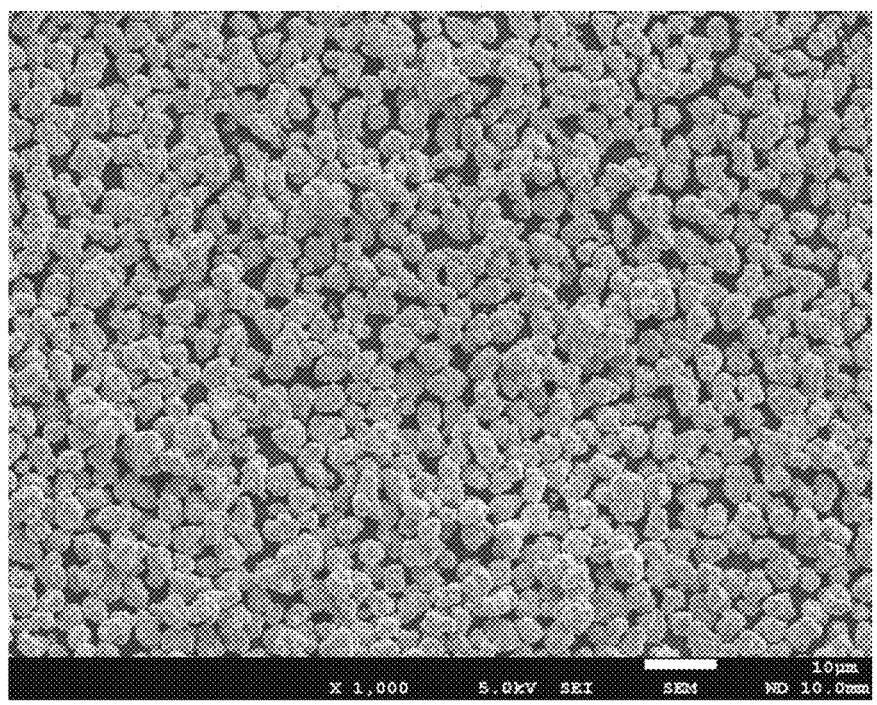
FIG. 8 shows a SEM photograph of lithium metal composite oxide which is a positive electrode active material according to the present invention (observation magnification of 1,000×).
Figure 9:
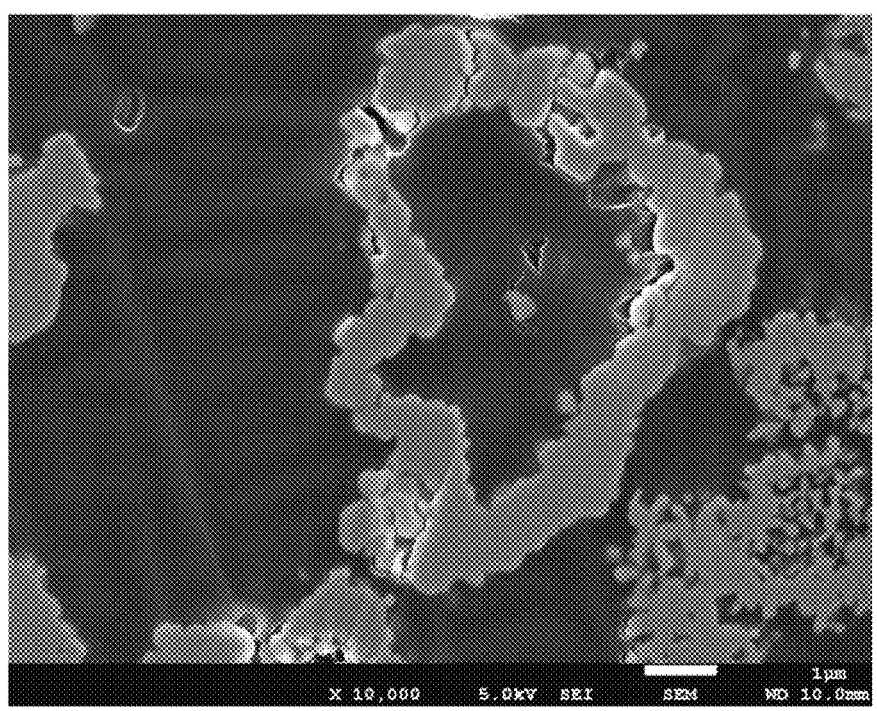
FIG. 9 shows a cross-sectional SEM photograph of lithium metal composite oxide which is a positive electrode active material according to the present invention (observation magnification of 10,000×).

As illustrated in FIG. 8 and FIG. 9, the positive electrode active material according to the present invention has a hollow structure comprising an outer shell portion in which aggregated primary particles are sintered and a hollow portion which is present inside the outer shell portion.

Such hollow structure enables an reaction surface area to be larger and an electrolyte solution to permeate from particle boundaries between the primary particles or voids in the outer shell portion thereby to perform insertion and removal of Li also at reaction interfaces on the surfaces of primary particles at the side of the hollow portion inside the particle, and therefore movement of Li ions and electrons are not prevented, whereby an output characteristic can be made higher.

Here, a ratio of the thickness of this outer shell portion with respect to a particle diameter of lithium metal composite oxide particles is preferably 5 to 45%, more preferably 8 to 38%. Also, an absolute value of the thickness of this outer shell portion is within a range of more preferably 0.5 to 2.5 μm, still more preferably 0.4 to 2.0 μm.

When a ratio of the thickness of this outer shell portion with respect to a particle diameter of lithium metal composite oxide particles is less than 5%, strength of lithium metal composite oxide particles is lowered, and therefore when powder thereof is handled and when the particles are used as a positive electrode of a battery, the particles are destroyed to generate fine particles, whereby an output characteristic is worsened. On the other hand, when a ratio of the thickness of this outer shell portion is more than 45%, an electrolyte solution is less present in the above-mentioned particle boundaries or voids which allows the electrolyte solution to permeate into the hollow portion inside the particles, whereby a surface area which contributes a battery reaction is smaller, and thus positive electrode resistance is increased, and an output characteristic is reduced.

Note that a ratio of the thickness of the outer shell portion with respect to a particle diameter of lithium metal composite oxide particles can be measured by observing a section of the lithium metal composite oxide particles with a scanning electron microscope.

For example, a plurality of lithium metal composite oxide particles (secondary particles) are embedded to a resin or the like and made into a state where cross-sections of said particles can be observed by cross-section polisher processing or the like. The ratio of the thickness of the outer she portion with respect to a secondary-particle diameter can be calculated as follows.

From the secondary particles in the resin, a particle whose cross-section of the almost center can be observed is selected, and a distance between 2 points, that is, a shortest distance between one point on the outer circumference of the outer shell portion and the other point on the inner circumference at the center side thereof is measured at 3 or more arbitrary positions, and an average thickness of the outer shell portion is thus obtained every particle. Then, said average thickness is divided by a secondary particle diameter, that is, a longest distance between arbitrary 2 points on the outer circumference, whereby the above-mentioned ratio of the thickness of the outer shell portion is calculated every particle. Furthermore, averaging said ratio of each particle which is obtained for 10 or more particles, a ratio of the thickness of the outer shell portion with respect to a secondary particle diameter in the above-mentioned lithium metal composite oxide particles can be calculated.

(2) Method of Producing Positive Electrode Active Material For Non Aqueous Electrolyte Secondary Batteries A method of producing a positive electrode active material according to the present invention has the following three steps.

[First Step]

A first step is a step of obtaining manganese composite hydroxide particles by separating a nucleation stage and a particle growth stage, wherein the manganese composite hydroxide particles are represented by a general formula:

$Ni_xCo_yMn_zM_t(OH)_{2+a}$ (wherein, $x+y+z+t=1$, $0 \le x \le 0.5$, $0 \le y \le 0.5$, $0.5 \le z < 0.8$, $0 \le t \le 0.1$, $0 \le a \le 0.5$, and M is an additive element and is at least one element selected from Mg, Ca, Al, Ti, V, Cr, Zr, Nb, Mo, and W), has an average particle diameter of 3 to 12 µm, and has [$(d_{90}-d_{10})$/average-particle-diameter], an index indicating a scale of particle-size distribution, of not more than 0.55; the nucleation stage such that a solution containing at least a manganese compound and a solution containing an ammonium ion supply source are supplied in a reaction vessel to make a reaction solution, and a sodium hydroxide solution is supplied with adjusting an addition amount thereof in order to maintain the reaction solution in the reaction vessel at a predetermined pH, and a pH of the reaction solution is controlled to 12.0 to 14.0 at a reference solution temperature of 25 degrees C. to form nuclei; and the particle growth stage is such that a pH of the reaction solution is controlled to be within a range of 10.5 to 12.0 at a reference solution temperature of 25 degrees C. and to be lower than that at the nucleation stage, and thereby to grow the nuclei formed in said nucleation stage.

[Second Step]

A second step is a step of heat-treating the manganese composite hydroxide particles obtained in the first step at 105 to 750 degrees C.

[Third Step]

A third step is a step of obtaining lithium metal composite oxide in such a manner that a lithium compound is added to the manganese composite hydroxide obtained through the second step, the manganese composite hydroxide before the heat treatment, or a mixture thereof so as to achieve a ratio Li/Me of from 1.05 to 1.95, the Me being a total number of atoms of metal elements other than lithium, the Li being the number of atoms of lithium, thereby forming a lithium mixture, and the formed lithium mixture is burned at a temperature of 800 to 1050 degrees C. in an oxidizing atmosphere and then pulverized.

Hereinafter, each of the steps will be explained in detail.

(2-a) First Step

The first step in the production method according to the present invention is a step of obtaining manganese composite hydroxide particles, the manganese composite hydroxide particles being represented by a general formula: $Ni_xCo_yMn_zM_t(OH)_{2+a}$ (wherein, $x+y+z+t=1$, $0 \le x \le 0.5$, $0 \le y \le 0.5$, $0.5 \le z < 0.8$, $0 \le t \le 0.1$, $0 \le a \le 0.5$, and N is an additive element and is at least one element selected from Mg, Ca, Al, Ti, V, Cr, Zr, Nb, Mo, and W), having an average particle diameter of 3 to 12 µm, and having not more than 0.55 of [$(d_{90}-d_{10})$/average-particle-diameter], an index indicating a scale of the particle-size distribution.

The composite hydroxide particles can be obtained by crystallization method capable of efficiently producing the particles, each being uniform in composition. Usually, when composite hydroxide is industrially produced by a crystallization method, a continuous crystallization method is applied in many cases. This method enables to produce composite hydroxide easily in large amounts, each of the composite hydroxide being uniform in composition. However, there is a problem that, in the continuous crystallization method, a particle-size distribution of the obtained product tends to be a comparatively wide normal-distribution, and particles which are of equal particle diameter and have a narrow particle-size distribution cannot necessarily be obtained.

Hence, it may be considered that composite hydroxide particles having a wide normal distribution are classified to obtain composite hydroxide having a narrow particle-size distribution, but there is no sieve having an opening which is capable of being used for particles having the same level of average particle diameter as that of the composite hydroxide particles according to the present invention, and thus classification by a sieve is difficult. Also, even using an apparatus such as a wet cyclone, the particles cannot be classified so as to have a sufficiently narrow particle-size distribution, and thus it is difficult to obtain composite hydroxide having a uniform particle diameter and a narrow particle-size distribution, by an industrial classification method.

In the present invention, to solve such problem, a nucleation stage and a particle growth stage are clearly separated, and a crystallization process which is to produce a nucleus in the nucleation stage and grow a particle from the nucleus in the subsequent particle growth stage is applied thereby to achieve an uniform particle diameter and to obtain composite hydroxide having a narrow particle-size distribution.

Therefore, the crystallization process applied so the first step in the present invention corresponds to a process of separating a nucleation stage and a particle growth stage to obtain manganese composite hydroxide particles according to the first step, wherein the nucleation stage is such that a solution containing at least a manganese compound, a solution containing a compound composed of nickel, cobalt, and an additive element M, as needed, and a solution containing an ammonium ion supply source are fed into a reaction vessel, and also a sodium hydroxide solution is fed thereinto with adjusting an addition amount thereof in order to maintain a reaction solution in the reaction vessel at a predetermined pH, and a pH of the reaction solution is controlled to 12.0 to 14.0 at a reference solution temperature of 25 degrees C. to form nuclei; and the particle growth stage is such that the pH of the reaction solution is controlled to be within a range of 10.5 to 12.0 at a reference solution temperature of 25 degrees C. and to be lower than that at the nucleation stage, and thereby to grow the nuclei formed in said nucleation stage.

Figure 2:
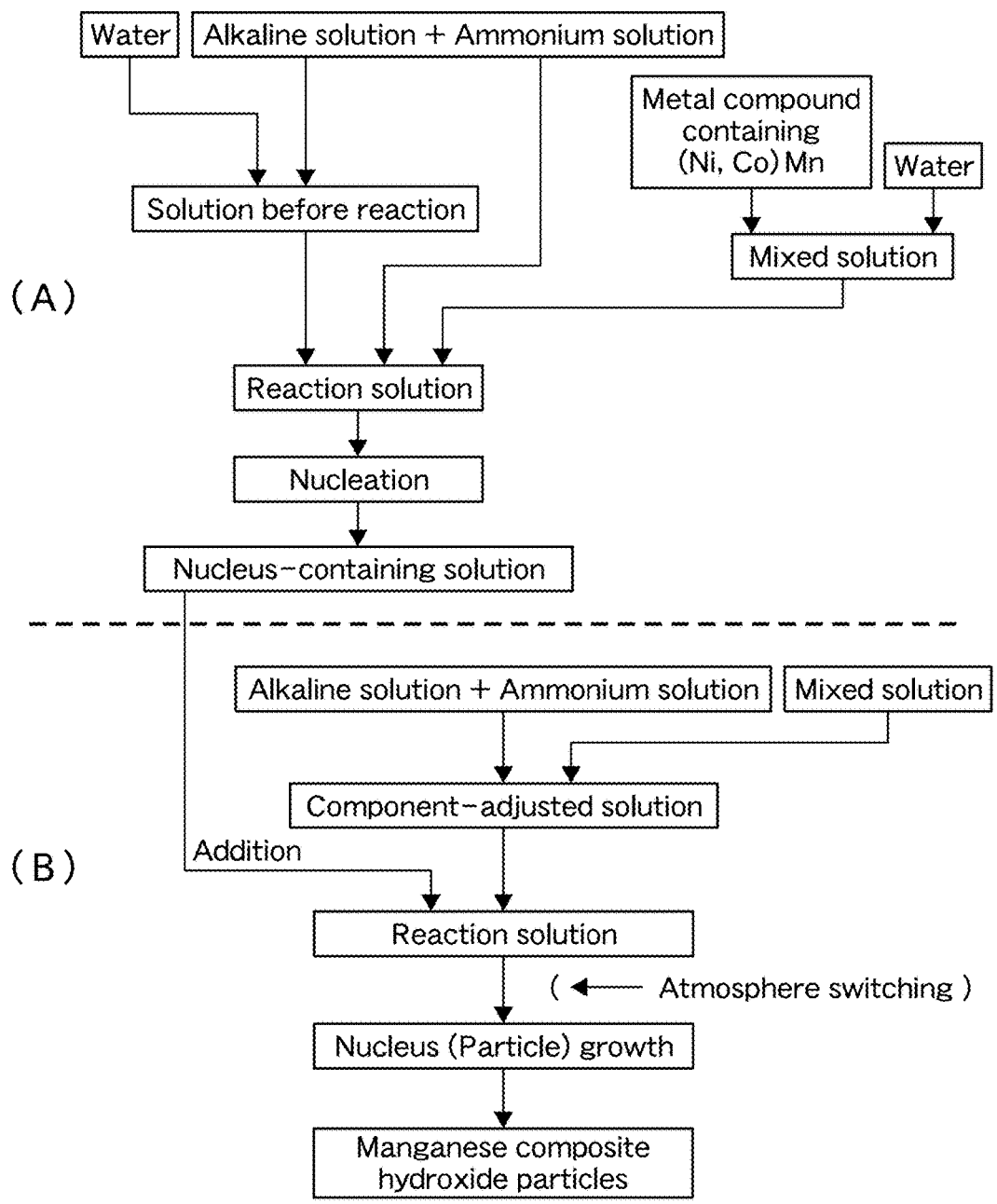
FIG. 2 is a schematic flow chart showing another aspect of the production process of manganese composite hydroxide particles in the first step.

FIGS. 1 and 2 schematically illustrate a method of producing the composite hydroxide particles in the first step. Note that, in FIG. 1 and FIG. 2, illustrates the nucleation stage while (B) illustrates the particle growth stage. Hereinafter, each of the stages will be explained in detail.

(Nucleation Stage)

First, readily water-soluble metal compounds constituting the above-mentioned general formula (hereinafter, these including an additive element, mentioned later will be sometimes referred to as metal compounds) are dissolved in water at a predetermined ratio to produce a manganese-mixed solution.

Next, the produced mixed solution and a solution containing an ammonium ion supply source are supplied to a reaction solution under stirring in a crystallization reaction vessel, and at the same time, a sodium hydroxide solution is also supplied thereto.

Here, an amount of the sodium hydroxide solution is adjusted so as to achieve a constant value of pH of the reaction solution within a range of 12.0 to 14.0 at a reference solution temperature of 25 degrees C., whereby a nucleus produced in the reaction solution hardly grows, and a minute nucleus of the above-mentioned composite hydroxide is selectively produced.

When the pH is less than 12.0, particle growth occurs simultaneously, and thus a total number of nuclei is insufficient and particles having a large particle diameter are produced, and if such state is maintained while the nucleation stage is shifted to the subsequent particle growth stage, compound hydroxide to be obtained by the crystallization process becomes large and a particle-size distribution also tends to be wider. On the other hand, when the pH is more than 14.0, a produced nucleus is too minute, and the reaction solution is gelled and thereby crystallization is sometimes difficult.

Furthermore, the pH is preferably controlled to a constant value, specifically preferably to be controlled to be in a fluctuation range of ±0.2. When the fluctuation range of pH is wider, a total number of the nuclei to be obtained is changed, and thereby the control of the particle diameter becomes difficult, which is not preferable.

Also, in order to obtain composite hydroxide particles having a good particle-size distribution, an amount of metal compounds supplied at the nucleation stage is preferably 0.1 to 2%, more preferably not more than 1.5% with respect to a total amount, that is, an amount of total metal compounds supplied to obtain composite hydroxide particles.

(Particle Growth Stage)

Next, in the particle growth stage, further formation of a nucleus is controlled and only particles of the nuclei obtained in the previous nucleation stage are grown, whereby composite hydroxide particles having a narrow range of particle-size distribution and a uniform particle diameter are obtained.

Therefore, in the particle growth stage, a pH of the reaction solution is controlled to be a constant value within a range of 10.5 to 12.0 at a reference solution temperature of 25 degrees C. Also, the pH is controlled by adjusting an amount of the sodium hydroxide solution. That is, when the pH is more than 12.0, further formation of a nucleus cannot be sufficiently controlled, thereby making a particle-size distribution of obtained particles wider. On the other hand, when the pH is less than 10.5, solubility of the metal compounds due to ammonia ions is high, and more metal ions remain in the solution without precipitating, which is not preferable. Further, when metal sulfate is used as a raw material, a more amount of S (sulfur) remains in the particles, which is not preferable.

Therefore, also a pH in the particle growth stage is preferably controlled at a constant value as is the case with the pH in the nucleus formation process, specifically preferably controlled to be in a fluctuation range of ±0.2. When a fluctuation range of the pH is wider, solubility of metal ions is changed, whereby a particle-size distribution of obtained composite hydroxide is sometimes wider.

Note that, since the pH of 12 is a boundary condition between nucleation and nuclear growth, depending on presence or non-presence of the nucleus in the reaction solution, such pH can be used as a condition for either the nucleation process or the particle growth process.

That is, when a pH in the nucleation stage is set at higher than 12 to form a large amount of nuclei and then the pH is set at 12 in the particle growth stage, a large amount of nuclei comes to be present in the reaction solution, and therefore nuclear growth occurs on a priority basis, whereby hydroxide particles having a narrow particle-size distribution and a comparatively large particle diameter are obtained.

On the other hand, when a pH is set at 12 in a state that no nucleus is present in the reaction solution, that is, in the nucleation stage, there is no nucleus to grow, and accordingly nucleation occurs on a priority basis, and therefore setting of a pH in the particle growth, process at less than 12 allows the formed nuclei to grow and the hydroxide particles having a good quality to be obtained.

Hence, in each of the cases, a pH in the particle growth stage just needs to be controlled to be lower than a pH in the nucleation stage, and in order to separate the nucleation and the particle growth clearly, a pH in the particle growth process is preferably set at lower than a pH in the nucleation process by 0.5 or more, more preferably by 1.0 or more.

Hereinafter, conditions common among the nucleation stage and the particle growth stage will be explained.

In the production method according to the present invention, metal ions are crystallized out as nuclei or composite hydroxide particles in the both processes, and therefore a ratio of a liquid component to a metal component in the reaction solution increased. In such state, seemingly, a concentration of the mixed solution to be supplied is decreased, and thus in the particle growth stage, composite hydroxide particles may not insufficiently grow.

Therefore, after the nucleation or during the particle growth stage, a part of a reaction solution is discharged out of a reaction vessel to increase a concentration of the compound hydroxide particles in the reaction solution, and then particle growth may continue to be performed.

With such method, composite hydroxide particles can be grown up in a state where a relative concentration of such a mixed solution is high, whereby a particle-size distribution of particles can be further narrowed and a particle density can also be made higher. Specifically, it is lust necessary to stop supplying the mixed solution and the like to a reaction solution and to stop stirring them, thereby precipitating nuclei and compound hydroxide particles, and then to discharge a supernatant solution of the reaction solution.

Shift from the nucleation stage to the particle growth stage is performed in such a manner that, for example, a pH of a reaction solution after completing nucleation is adjusted to a pH for the particle growth stage, and thereby particle growth is succeedingly performed, whereby shift to the particle growth stage can be completed quickly. Such pH adjustment can be easily performed by temporarily stopping the supply of an alkaline solution, and besides, the pH may be adjusted by adding inorganic acid which is the same kind of acid constituting a metal compound, for example, sulfuric acid in the case of sulfate, to a reaction solution.

On the other hand, the particle growth stage may be performed in such a manner that there has been prepared a reaction vessel in which a reaction solution adjusted to a pH and an ammonium ion concentration suitable for the particle growth stage is put, and to this reaction vessel for the particle growth stage, a solution containing a nucleus formed in another reaction vessel and to be used as a seed crystal is added.

In this case, since the nucleation stage and the particle growth stage can be separated surely, a state of the reaction solution in each of the stages can be adjusted to be an optimum condition for each stage. Particularly, a pH of a reaction solution can be adjusted to an optimal condition from the initial stage to start the particle growth stage, and thus a particle-size distribution is made narrower and a particle diameter is made more uniform.

In the production method according to the present invention, atmosphere control at the time of a crystallization reaction is also important.

Specifically, in the case where an atmosphere at the time of a crystallization reaction is oxidizing, oxidation of metal elements in composite hydroxide particles is accelerated at the time of the nucleation and the particle growth, whereby minute voids are formed in structures inside composite hydroxide secondary particles. Therefore, control of an oxygen concentration of the atmosphere in the nucleation stage and the particle growth stage, or combination of time periods for exposure to each of an oxidizing atmosphere and a non-oxidizing atmosphere in the particle growth stage enables a degree of the voids formed in the compound hydroxide particles to be changed and thereby denseness to be controlled.

Figure 6:
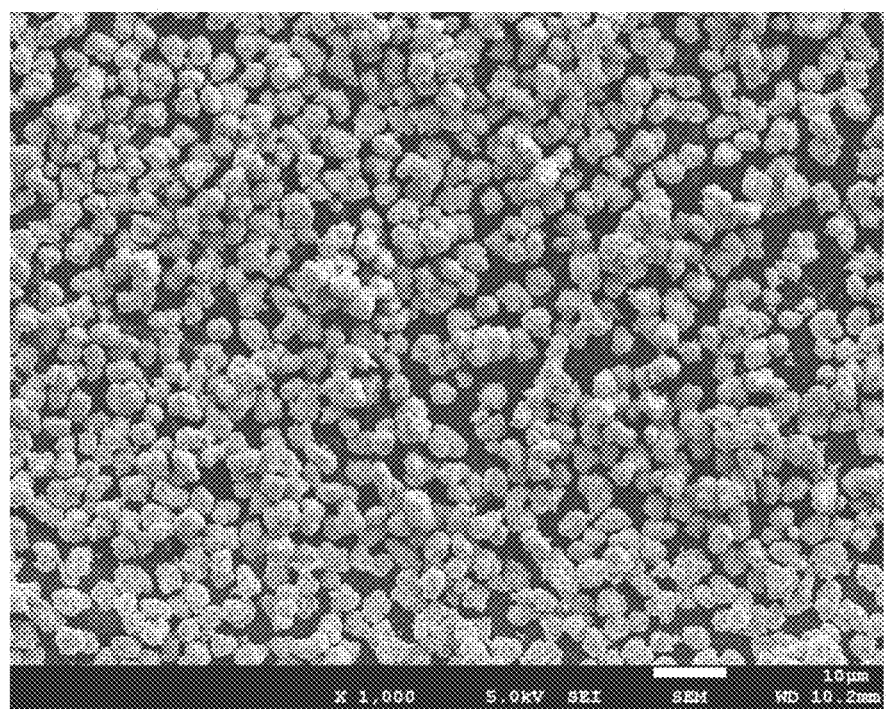
FIG. 6 shows a SEM photograph of manganese composite hydroxide according to the present invention (observation magnification of 1,000×).
Figure 7:
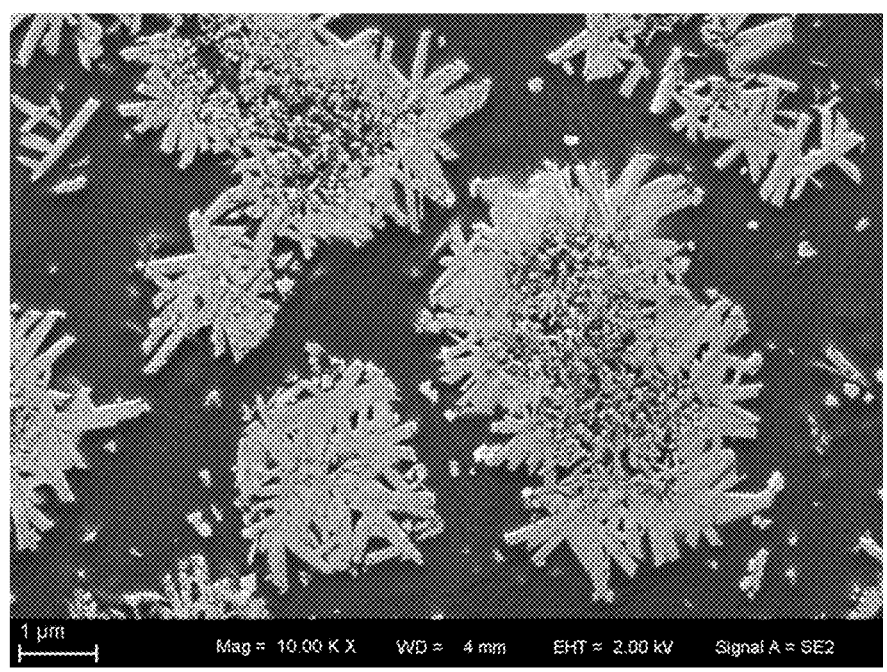
FIG. 7 shows a cross-sectional SEM photograph of manganese metal composite hydroxide according to the present invention (observation magnification of 10,000×).

The manganese composite hydroxide particles obtained in the first step are, as illustrated in FIG. 6, particles having an approximately spherical shape, and more specifically, as illustrated in FIG. 7, are secondary particles formed by aggregation of a plurality of plate-like primary particles and having an approximately spherical form.

Such structure allows lithium to sufficiently diffuse into the particles, and thus a positive electrode active material having a uniform and good distribution of lithium can be obtained in the third step (sinter) of forming lithium metal composite oxide as a positive electrode active material according to the present invention.

Also, when metal composite oxide having a hollow structure comprising an outer shell portion in which aggregated primary particles are sintered and a hollow portion which is present inside the outer shell portion is obtained as a positive electrode active material according to the present invention, manganese composite hydroxide having a structure comprising a center portion composed of fine primary particles inside a particle and an outer shell portion composed of plate-like primary particles larger than said fine primary particles outside the central portion is used.

Here, since the center portion has a structure having fine primary particles lying in a line and many gaps, compared with the outer shell portion composed of larger and thicker plate-like primary particles, shrinkage of the center portion by sintering occurs at a lower temperature in the burning. Thus, sintering starts to proceed at a low temperature in the burning, and shrinkage then proceeds from the center of the particle to the outer shell portion thereof where sintering proceeds at low speed, whereby a space is formed in the center portion. Furthermore, the center portion is considered to have a low density and a higher degree of shrinkage, and thus the center portion become a space having a sufficient size. Thus, the positive electrode active material obtained after burning has a hollow structure.

Also, it is more preferable that the plate-like primary particles aggregate in a random direction to form secondary particles. This is because such an aggregation of plate-like primary particles in a random direction allows voids to be formed approximately uniformly among the primary particles, and therefore, in mixing with lithium compounds and burning the mixture, the melted lithium compounds spread into secondary particles, and thus lithium sufficiently diffuses.

Furthermore, the aggregation of the primary particles in a random direction allows shrinkage of the center portion in the burning to be uniformly caused, whereby a space having a sufficient size inside the positive electrode active material can be formed, which is preferable.

In order to form a space in burning as mentioned above, the fine primary particles preferably have an average particle diameter of 0.01 to 0.3 μm, more preferably 0.1 to 0.3 μm. Furthermore, the plate-like primary particles larger than the fine primary particles preferably have an average particle diameter of 0.3 to 3 μm, more preferably 0.4 to 1.5 μm, still more preferably 0.4 to 1.0 μm. When the fine primary particles have an average particle diameter of less than 0.01 μm, a center portion having a sufficient size is sometimes not formed in the composite hydroxide particles, while when the fine primary particles have an average particle diameter of more than 0.3 μm, the sintering start at a lower temperature and the shrinkage are not sufficiently achieved, and therefore a space having a sufficient size is sometimes not obtained after burning.

On the other hand, when the plate-like primary particles of the outer shell portion have an average particle diameter of less than 0.3 μm, sintering in burning is performed at a lower temperature, whereby a space having a sufficient size is sometimes not obtained after the burning, while when the plate-like primary particles have an average particle diameter of more than 3 μm, a burning temperature needs to be made higher in order to achieve sufficient crystallinity of the positive electrode active material to be obtained, and thus sintering occurs among the secondary particles, whereby an particle diameter of the positive electrode active material obtained sometimes exceeds the above-mentioned ranges.

Furthermore, the fine primary particles preferably have plate-like shape and/or needle-like shape. The fine primary particles having such shapes allow the center portion to have a sufficiently low density, and a large shrinkage by burning to be caused and thereby to form a space having a sufficient size.

Furthermore, in the above-mentioned secondary particles, the outer shell portion preferably has a thickness of 5 to 45%, more preferably 7 to 35% at a ratio of the thickness thereof with respect to a particle diameter of the secondary particles.

The positive electrode active material particles obtained by using the composite hydroxide as a raw material have a hollow structure, and as a ratio of a thickness of the outer shell portion with respect to a particle diameter of the positive electrode active material particles, the ratio in the composite hydroxide secondary particles is approximately maintained.

Therefore, when the ratio of the thickness of the outer shell portion with respect to the diameter of the secondary particles is within the above-mentioned range, a hollow portion sufficient for lithium metal composite oxide particles can be formed. When the ratio of the thickness of the outer shell portion with respect to the diameter of the secondary particles is less than 5%, that is, the thickness is too thin, shrinkage of composite hydroxide particles is larger and sintering among secondary particles of lithium metal composite oxide occurs in the burning for producing the positive electrode active material, whereby a particle-size distribution of the positive electrode active material is sometimes worsened. On the other hand, when the ratio is more than 45%, there is sometimes caused a problem that, for example, a center portion having a sufficient size is not formed.

Note that such a ratio of the thickness of the outer shell portion with respect to the diameter of the secondary particles can be measured in the same manner as a ratio of a thickness of the outer shell, portion in lithium metal composite oxide particles. Also, particle diameters of the fine primary particles and the plate-like primary particles can be measured as follows, for example.

First, a plurality of manganese composite hydroxide particles (secondary particles) are embedded to a resin or the like, and, by cross-section polisher processing or the like, are made into a state where cross-sections of said particles can be observed. Particle diameters of the fine primary particles and the plate-like primary particles can be obtained in such a manner that a maximum diameter of a cross-section of each of preferably 10 or more primary particles in the secondary particle is measured as a particle diameter and then an average value thereof is calculated.

The atmosphere control allows growth of the primary particles constituting manganese composite hydroxide particles to be controlled. In an oxidizing atmosphere, there are formed particles composed of fine primary particles, having many voids, and having a low density. In a weak-oxidizing to non-oxidizing atmosphere, there are formed particles composed of larger primary particles, having less voids, and having a high density.

Accordingly, by setting the nucleation stage and a part, of the initial stage of the particle growth stage at an oxidizing atmosphere, a center portion composed of fine primary particles is formed, while, by switching from the oxidizing atmosphere to a weak-oxidizing to non-oxidizing atmosphere in the subsequent particle growth stage, a particle structure having an outer shell portion composed of plate-like primary particles larger than fine primary particles and being present outside the central portion can be formed, and a positive electrode active material having a hollow structure can be obtained by burning in the downstream process.

On the other hand, when, through the whole of a crystallization reaction, an oxygen concentration of an inner space of a reaction vessel is controlled to be 5% by volume, the whole of the composite oxide particle is composed of comparatively large-size primary particles, whereby the particle may have a solid-core structure after burning.

In the crystallization reaction under such a controlled atmosphere, usually, primary particles at the center portion are plate-like and/or needlelike fine particles while primary particles at the outer shell portion are plate-like. However, the primary particles sometimes have a rectangular parallelepiped, ellipse, or rhombohedron form, depending on the composition.

The oxidizing atmosphere for forming the center portion according to the present invention is defined as an atmosphere having an oxygen concentration of more than 1% by volume in a space inside a reaction vessel. The oxidizing atmosphere preferably has an oxygen concentration of more than 2% by volume in a space inside a reaction vessel, more preferably an oxygen concentration of more than 10% by volume, and particularly preferably an easily controllable atmosphere (oxygen concentration: 21% by volume).

An atmosphere having an oxygen concentration of more than 1% by volume in a space inside a reaction vessel allows primary particles to have an average particle diameter of 0.01 to 0.3 μm. When the oxygen concentration is not more than 1% by volume, primary particles in the center portion sometimes have an average particle diameter of more than 0.3 μm. The upper limit of an oxygen concentration in a space between a reaction vessel lid and a liquid surface is not particularly limited, but when the oxygen concentration is more than 30% by volume, the primary particles sometimes have an average particle diameter of less than 0.01 μm, which is not preferable.

On the other hand, a weak-oxidizing to non-oxidizing atmosphere for forming the outer shell portion according to the present invention is defined as an atmosphere having an oxygen concentration of not more than 1% by volume in a space between a reaction vessel lid and a liquid surface. The atmosphere is controlled so as to be a mixed atmosphere of oxygen and inert gas having preferably the oxygen concentration of not more than 0.5% by volume, more preferably not more than 0.2% by volume.

Particle growth with an oxygen concentration of not more than 1% by volume in a space between a reaction vessel lid and a liquid surface makes it possible to control unnecessary oxidation of particles and to accelerate the growth of primary particles, and thereby obtain secondary particles having a high-density outer shell portion in which primary particles have an average particle diameter of 0.3 to 3 μm, which is larger than that in the center portion, and are of equal particle size, and have less voids and a high density. Examples of means for maintaining a space in a reaction vessel at such atmosphere include circulation of inert gas, such as nitrogen, over the space in the reaction vessel, and furthermore bubbling of inert gas in a reaction solution.

The timing of switching of an atmosphere in the particle growth stage is determined with considering a size of the center portion of manganese composite hydroxide particles so that a hollow portion not causing the formation of fine particles and thereby not worsening a cycle characteristic is obtained in a finally-obtained positive electrode active material.

For example, the switching is performed at the point in time when 0 to 40%, preferably 0 to 30%, more preferably 0 to 25% of a total time of the particle growth stage has passed since the particle growth stage is started. When the switching is performed at the point in time when more than 30% of a total time of the particle growth stage has passed, a center portion is formed large, whereby a thickness of the outer shell portion with respect to a particle diameter of the secondary particles is sometimes too thin.

On the other hand, when the switching is performed before the start of the particle growth stage, that is, during the nucleation stage, a center portion is formed too small, or secondary particles having the above-mentioned structure are not formed.

An ammonia concentration of the reaction solution is maintained at a constant value within a range of preferably 3 to 25 g/L, more preferably 3 to 15 q/L. An ammonia concentration of less than 3 g/L does not allow solubility of metal ions to be maintained at a constant value, whereby well-regulated hydroxide particles are not formed and a gel-like nucleus is easily formed in the nucleation stage. Therefore, the particle size distribution becomes easily wider. On the other hand, an ammonia concentration of more than 25 g/L allows hydroxide to be formed to have a high density, whereby a finally-obtained positive electrode active material for nonagueous electrolyte secondary batteries has a high-density structure and a specific surface area is lower, which is not preferable.

Furthermore, the ammonia concentration is preferably controlled to be a constant value, specifically preferably controlled to be within a fluctuation range of ±2.5 g/L. When this ammonia concentration is changed, solubility of metal ions is also changed, whereby uniform hydroxide particles are not sometimes formed.

Note that an ammonium ion supply source is not particularly limited, but, for example, ammonia, ammonium sulfate, ammonium chloride, ammonium carbonate, ammonium fluoride, and the like may be used.

The reaction solution preferably has a temperature of 35 to 60 degrees C.

When the temperature of the reaction solution is set at less than 35 degrees C., solubility of metal ions to be supplied is not sufficiently achieved, and thereby nucleus formation is easily caused and is controlled with difficulty. On the other hand, the temperature at more than 60 degrees C. allows volatilization of ammonia to be accelerated, whereby ammonia for formation of complex runs short, and solubility of metal ions is easily decreased as is the above-mentioned case, which is not preferable.

A particle diameter of composite hydroxide particles can be controlled by a total number of nuclei in the nucleation stage, the total number of nuclei controllable by a pH or an ammonia concentration of a reaction solution in the nucleation stage and by an amount of metal components in a mixed solution to be supplied. That is, the number of nuclei to be formed can be made larger in such a manner that a pH during the nucleation is adjusted to a higher pH side, or an amount of metal compounds to be added is increased by making a nucleation time longer. Thus, also when the same conditions are applied to the particle growth stage, a particle diameter of composite hydroxide particles can be made smaller. On she other hand, when she number of nuclei to be formed is controlled to be smaller, a particle diameter of composite hydroxide particles can be larger.

Additionally, a particle diameter of composite hydroxide particles is controllable by an amount of metal compounds to be added in the particle growth stage. When the particle growth stage is continued with a metal compound added until composite hydroxide particles grow up to have a desired particle diameter, compound hydroxide particles having the desired particle diameter can be obtained.

As the metal compound to be added, a compound solution or additive elements to improve battery characteristics may be supplied as needed. In the case where addition of the compound solution to a mixed solution causes formation of a precipitate, the compound solution and the mixed solution are individually and simultaneously supplied to a reaction solution. A composition ratio of each metal in an obtained composite hydroxide is in agreement with a composition ratio of metal components contained in each of the solutions, and therefore an amount of metal compounds to be dissolved in each of the solutions needs to be adjusted so as to achieve a desired composition ratio of metal components. As the metal compound to be used, a water-soluble compound, such as nitrate, sulfate, or hydrochloride, may be used. For example, nickel sulfate, cobalt sulfate, or manganese sulfate is preferably used.

The mixed solution preferably has a concentration of 1 to 2.6 mol/L, more preferably 1 to 2.2 mol/L in a total of metal compounds.

Even when the mixed solution has a concentration of less than 1 mol/L, crystallization reaction of composite hydroxide particles is possible, but an amount of precipitate per reaction vessel is smaller and thereby productivity is reduced, which is not preferable. On the other hand, when the mixed solution has a concentration of more than 2.6 mol/L, the concentration exceeds a saturated concentration thereof at room temperature, whereby a crystal re-precipitates and thereby causes a risk, such as blocking of equipment piping.

The metal compound may not be necessarily fed into a reaction vessel in a form of a mixed solution, and an individual solution of each metal compound may be fed into a reaction vessel at a predetermined rate so that a concentration of a total of the metal compounds in a reaction solution is within the above-mentioned range.

As an additive element (M, M1, M2: at least one element selected from Mg, Ca, Al, Ti, V, Cr, Zr, Nb, Mo, and W), a water-soluble compound is preferably used, and there may be used, for example, titanium sulfate, ammonium peroxotitanate, titanium oxalate potassium, vanadium sulfate, ammonium vanadate, chromium sulfate, potassium chromate, zirconium sulfate, zirconium nitrate, niobium oxalate, ammonium molybdate, sodium tungstate, and ammonium tungstate.

To uniformly disperse the above-listed additive element inside composite hydroxide particles, what is necessary is to add an additive containing the additive element to a mixed solution, whereby, while the additive element is uniformly dispersed inside the composite hydroxide particles, coprecipitation thereof can be performed.

To coat surfaces of the composite hydroxide particles with an additive element, for example, the composite hydroxide particles are slurried with a solution containing an additive element and controlled to have a predetermined pH, while a solution containing the at least one additive element is added thereto, and the additive element is precipitated on surfaces of the composite hydroxide particles by a crystallization reaction, whereby the surfaces can be uniformly coated with the additive element.

In this case, instead of the solution containing an additive element, an alkoxide solution of the additive element may be used. Furthermore, the surfaces of the composite hydroxide particles can be coated with an additive element also in such a manner that a solution or a slurry containing the additive element is sprayed to the composite hydroxide particles and dried. Furthermore, the surfaces can be coated also in such a manner that a slurry in which composite hydroxide particles and a salt containing the at least one additive element are suspended is sprayed and dried, or composite hydroxide is mixed with a salt containing the at least one additive element by a solid phase method.

Note that, when the surfaces are coated with an additive element, an atomic ratio of additive element ions contained in a mixed solution is made smaller by the coating amount in advance, whereby the atomic ratio can be made in agreement with an atomic ratio of metal ions of obtained composite hydroxide particles. Also, the process of coating the surfaces of the particles with an additive element may be performed for composite hydroxide particles after heating the particles.

In the production method of separating the nucleation stage and the particle growth stage as mentioned above, there is used an apparatus having a system not to collect a product until a reaction is completed. Examples of the apparatus include a batch reaction vessel, which is usually used and in which a stirrer is installed. In the case where such apparatus is adopted, unlike a continuous crystallizer which collects a product by a common overflow, a problem that particles under growth are collected simultaneously with an overflow liquid does not arise, and therefore particles which have a narrow particle-size distribution, and are of equal particle diameter can be obtained.

To control an atmosphere at the time of the crystallization reaction, an apparatus capable of controlling an atmosphere, such as a closed type apparatus, is preferably applied. The use of such apparatus allows oxidation of the above-mentioned metal element to be easily controlled at the nucleation stage and the particle growth stage.

A mixed solution, a solution containing an ammonium ion supply source, and a sodium hydroxide solution, each being to be used, may be fed in by a pump capable of flow rate control. Also, feeding amounts of a solution containing an ammonium ion supply source and a sodium hydroxide solution are adjusted with measuring a reaction solution by a common ion-meter or pH-meter.

The production method explained above enables manganese composite hydroxide particles having a desired composition, particle size, and structure to be obtained. A composition, ratio of metal elements contained in the composite hydroxide particles hardly changes depending on a downstream process. Therefore, when a composition ratio of the composite hydroxide particles is made to have the same composition ratio of the positive electrode active material to be finally obtained, a positive electrode active material which has good characteristics when used for a battery can be obtained.

Furthermore, the average particle diameter of the composite hydroxide particles also hardly changes depending on a downstream process and therefore is made to be within a range equivalent to that of the positive electrode active material to be finally obtained, that is, 3 to 12 μm. On the other hand, [(d90-d10)/average-particle-diameter], an index indicating a scale of particle-size distribution, is sometimes slightly worsened depending on a downstream process such as burning. Therefore, an index for the composite hydroxide needs to be slightly better than that for the positive electrode active material, that is, needs to be not more than 0.55.

(2-b) Second Step

The second step is a step of heat-treating the manganese composite hydroxide particles obtained in the first step at 105 to 750 degrees C.

This step enables residual water in the composite hydroxide particles to be decreased by removal. Also, the step enables the composite hydroxide particles to be converted into composite oxide particles, whereby variations in a ratio of the number of metal atoms and a ratio of the number of lithium atoms in the positive electrode active material obtained can be prevented.

Note that, what is necessary is lust to remove the water to such an extent that variation in the ratio is not caused, and therefore all the composite hydroxide particles may not be necessarily converted into compound oxide particles, and a mixture of composite hydroxide and composite oxide is acceptable. However, in order to correctly control a ratio of the number of metal atoms and a ratio of the number of lithium atoms in the positive electrode active material to be obtained, all composite hydroxide particles are preferably converted into compound oxide particles at a heat treatment temperature of not less than 500 degrees C.

The heat treatment aims at removal of water and conversion into compound oxide particles, and therefore just needs to be performed in an oxidizing atmosphere, but it is easier and more preferable to perform the heat treatment in an atmosphere having a sufficient flow rate. When the heat treatment is performed at a temperature of less than 105 degrees C., the heat treatment takes a long time and therefore is not industrially suitable, and in addition, cannot remove residual water sufficiently. On the other hand, when the heat treatment is performed at a temperature of more than 750 degrees C., sintering is caused among the particles which are formed as composite oxide and a particle-size distribution is worsened, which is not preferable.

A heat treatment time is not limited, but, when it is less than 1 hour, residual water in compound hydroxide particles is sometimes not sufficiently removed, and therefore a heat treatment time is preferably more than 1 hour, more preferably 5 to 15 hours.

The aim of the second step is to prevent variation in a ratio of the number of metal atoms and a ratio of the number of lithium atoms in the positive electrode active material, and therefore may be omitted when the control of the composition can be sufficiently carried out.

Equipment used for this heat treatment is not particularly limited, and equipment capable of heating in air flow is good enough, and air-blowing and drying equipment and an electric furnace without generation of gas may be suitably used.

(2-c) Third Step

The third step is a step of mixing the composite hydroxide or the composite oxide obtained in the second step, or a mixture thereof with a lithium compound, and then burning the resulting mixture at a temperature of 800 to 1050 degrees C. in an oxidizing atmosphere.

The mix with a lithium compound is performed so that a ratio (Li/Me) of the number of lithium atoms (Li) to the total number of atoms of metal elements other than lithium (Me) in the obtained lithium metal composite oxide is 1.05 to 1.95, whereby a lithium mixture formed. The Li/Me ratios before and after burning are approximately the same, and therefore, when the Li/Me ratio of the mixture is made equivalent to the Li/Me ratio of the lithium metal composite oxide, a positive electrode active material having excellent battery characteristics can be achieved.

As the lithium compound, this is not particularly limited, but either lithium hydroxide or lithium carbonate, or a mixture thereof may be preferably used. In view of ease of handling and stability of quality, lithium carbonate is more preferably used.

Manganese compound hydroxide and a lithium compound which are to be subjected to such burning are preferably sufficiently mixed before the burning. When they are mixed insufficiently, individual particles have different Li/Me, whereby a problem that sufficient battery characteristics are not achieved or the like may arise.

In the mix, an ordinary mixer, such as a shaker mixer, a Lodige mixer, a Julia mixer, or a V blender, may be used, and the mix with a lithium compound just needs to be sufficiently performed to the extent that a form of heat-treated particles is not broken.

Here, In case of forming a compound layer having a layer thickness of not more than 20 nm and containing lithium and condensed tungsten in a surface or a particle boundary of the lithium metal composite oxide, a tungsten compound is preferably further mixed at the time of formation of a lithium mixture. Tungsten may be made to be contained in manganese composite hydroxide as an additive element, but mix of a tungsten compound with the lithium mixture allows said compound layer to be sufficiently formed.

A tungsten compound to be mixed preferably has an average particle diameter of not more than ⅕ times as large as an average particle diameter of the above-mentioned manganese composite hydroxide or manganese composite oxide. When the tungsten compound has an average particle diameter of larger than ⅕ times as large as it, the above-mentioned compound layer is not formed, and particles in which lithium tungstate is present alone are formed, and besides, local unevenness in concentration is caused, whereby the compound layer does not sometimes have an average layer thickness of not more than 20 nm.

An amount of tungsten contained in the layer is just controlled as an amount of a tungsten compound to be mixed at the time of formation of a lithium mixture, and the number of tungsten atoms is controlled so as to be 0.1 to 3.0 atom % with respect to the total number of atoms of metal elements other than lithium contained in the lithium metal composite oxide.

Furthermore, an amount of tungsten in the whole of lithium metal composite oxide is controlled as a total of an amount of tungsten contained in manganese composite hydroxide and an amount of a tungsten compound to be mixed. As for an amount of a lithium compound to be mixed, an amount thereof enough to form lithium tungstate by a tungsten compound added at the time of formation of a lithium mixture is preferably additionally added.

When a burning temperature in the third step is less than 800 degrees C., lithium, does not sufficiently diffuse into manganese composite hydroxide or manganese composite oxide particles, whereby excess lithium and unreacted manganese composite oxide remain, or a Mn spinel phase remains, and a thus obtained crystal structure is not wellordered. On the other hand, when the burning temperature is more than 1050 degrees C., intense sintering between lithium metal composite oxide particles is caused, and also abnormal particle growth is caused, whereby the particles becomes coarse and thereby a form of spherical secondary particles and a particle-size distribution thereof cannot be maintained.

Furthermore, when the burning is performed under any temperature condition other than the temperature range according to the present invention, a battery capacity is reduced. Therefore, by burning at a temperature of 800 to 1050 degrees C., more preferably 900 to 1000 degrees C., lithium metal composite oxide demonstrating good characteristics when used for batteries can be obtained.

Note that, in view of achieving a uniform reaction of heat-treated particles with a lithium compound, a temperature is preferably increased up to said temperature at a temperature elevation rate of 3 to 10 degrees C. per minute. Furthermore, when a burning temperature is kept at around the melting point of a lithium compound for approximately 1 to 5 hours, the reaction can be more uniformly performed.

This burning time is preferably not less than 1 hour, more preferably 4 to 24 hours, still more preferably 5 to 15 hours. When the burning time is less than 1 hour, lithium metal composite oxide is sometimes not sufficiently formed.

Also, in the burning, it is preferable that calcination is performed before the burning with maintaining a temperature of 350 to 800 degrees C., which is lower than the burning temperature, for approximately 1 to 10 hours, followed, by burning at 800 to 1050 degrees C. This is because, when the temperature is kept at around the melting point of lithium hydroxide or lithium carbonate or around the reaction temperature, lithium is sufficiently diffused, whereby uniform lithium metal composite oxide can be obtained.

The burning atmosphere is an oxidizing atmosphere, and preferably an atmosphere having an oxygen concentration of 18 to 100% by volume. That is, the burning is preferably performed in an air to oxygen atmosphere. In view of cost, the burning is more preferably performed in an air current. An oxygen concentration of less than 18% by volume leads to insufficient oxidation, thereby sometimes causing insufficient crystallinity of lithium metal composite oxide.

A furnace used for the burning is not particularly limited and may be a furnace capable of heating in an all to oxygen atmosphere is good enough to be used, but an electric furnace without as generation is preferably used, and the furnace to be used is a batch type or continuous type furnace.

Pulverizing is performed after the burning to obtain a positive electrode active material for nonaqueous electrolyte secondary batteries.

When burning is performed within a temperature range according to the present invention, intense sintering between lithium metal composite oxide particles is not caused, but sintering neck between secondary particles and the like is sometimes caused, and therefore pulverizing is performed to cancel the sintering neck and the like and thereby obtain a positive electrode active material having a good particle-size distribution. Note that the pulverizing is an operation to supply mechanical energy to aggregation composed, of a plurality of secondary particles resulting from sintering neck and the like and thereby to separate the secondary particles and loosen the aggregation without substantially destroying the secondary particles.

(3) Nonaqueous Electrolyte Secondary Battery

A nonaqueous electrolyte secondary battery according to the present invention comprises a positive electrode, a negative electrode, a nonaqueous electrolyte solution, and the like, and is configured of the same components as in an ordinary nonaqueous electrolyte secondary battery. Note that embodiments described below are only examples, and, based on the embodiments shown here, the nonaqueous electrolyte secondary battery of the present invention can be realized in a form in which various changes and improvements are made based on the knowledge of a person skilled in the art. Furthermore, the use of the nonaqueous electrolyte secondary battery according to the present invention is not particularly limited.

(3-a) Positive Electrode

Using the positive electrode active material for nonaqueous electrolyte secondary batteries obtained as mentioned above, a positive electrode to be used in a nonaqueous electrolyte secondary battery is produced, for example, as follows.

First, a positive electrode active material, in powder form, an electric conductive material, and a binding agent are mixed, and furthermore, activated carbon and a solvent for viscosity adjustment and the like are added as needed, and these are kneaded to produce a positive electrode mixture paste.

At this time, a mixing ratio of each component in the positive electrode mixture paste is also an important factor to determine performance of a nonaqueous electrolyte secondary battery. When a solid content in the positive electrode mixture except the solvent is taken as 100 parts by mass, it is preferable that, as is the case with a positive electrode of an ordinary nonagueous electrolyte secondary battery, a content of the positive electrode active material is 60 to 95 parts by mass, a content, of the electric conductive material is 1 to 20 parts by mass, and a content of the binding agent is 1 to 20 parts by mass.

The obtained positive electrode mixture paste is, for example, applied to a surface of a current collector made of aluminum foil, and dried to scatter the solvent. As needed, pressurization is performed by a roll press or the like in order to increase electrode density. Thus, a sheet-like positive electrode can be produced. This sheet-like positive electrode can be, for example, cut into a suitable size in accordance with an objective battery, and used for producing a battery. Note that the manufacturing method of a positive electrode is not limited to the example, but may be another method.

In the production of the positive electrode, as an electric conductive agent, for example, graphite (natural graphite, artificial graphite, expanded graphite, or the like), or a carbon black material, such as acetylene black or Ketchen black, may be used.

The binding agent plays a role which ties active material particles, and for example, polyvinyisdene fluoride (PVDF), polytetrafluoroethylene (PTFE), fluororubber, ethylene propylene diene rubber, styrene butadiene, cellulose resin, polyacrylic acid, or the like may be used as the binding agent.

As needed, the positive electrode active material, the electric conductive material, and the activated carbon are dispersed, and a solvent which dissolves the binding agent is added to the positive electrode mixture. As the solvent, specifically, an organic solvent, such as N-methyl-2-pyrrolidone, may be used. The activated carbon may be added to the positive electrode mixture in order to increase electrical double-layer capacity.

(3-b) Negative Electrode

As a negative electrode, there is used a material obtained in such a manner that a binding agent is mixed with metallic lithium, a lithium alloy, or a negative electrode active material capable of inclusion and desorption of lithium ions, and then a suitable solvent is added thereto to make a negative electrode mixture into paste form, and the negative electrode mixture is applied to a surface of a current collector made of metallic foil, such as copper, and dried, and then compressed and formed as needed in order to increase electrode density.

As the negative electrode active material, for example, natural graphite, artificial graphite, an organic compound burned material, such as phenol resin, and powder of a carbon substance, such as coke, may be used.

In this case, as the negative electrode binding agent, a fluorine-containing resin, such as PVDF, may be used as is the case with the positive electrode. As a solvent which disperses the active material and the binding agent, an organic solvent, such as N-methyl-2-pyrrolidone, may be used.

(3-c) Separator

A separator is arranged so as to be sandwiched between the positive electrode and the negative electrode.

The separator serves to separate the positive electrode and the negative electrode and to maintain an electrolyte, and for the separator, a thin film made or polyethylene, polypropylene, or the like and having many minute pores may be used.

(3-d) Nonagueous Electrolyte Solution

A nonaqueous electrolyte solution is obtained by dissolving lithium salt as a supporting electrolyte in an organic solvent.

As the organic solvent, there may be used one kind alone or two or more kinds mixed, selected from the group consisting of a cyclic carbonate, such as ethylene carbonate, propylene carbonate, butylene carbonate, and trifluoro propylene carbonate; a chain carbonate, such as diethyl carbonate, dimethyl carbonate, ethylmethyl carbonate, and dipropyl carbonate; an ether compound, such as tetrahydrofuran, 2-methyltetrahydrofuran, and dimethoxyethane; a sulfur compound, such as ethylmethylsulfone, and butanesultone; a phosphorus compound, such as triethyl phosphate, and trioctyl phosphate; and the like.

As the supporting electrolyte, LiPF6, $LiBF_4$, $LiClO_4$, $LiAsF_6$, $LiN(CF_3SO_2)_2$, a compound salt thereof, or the like may be used.

Furthermore, the nonaqueous electrolyte solution may contain a radical scavenger, a surface active agent, a flame retardant, and the like.

(3-e) Shape and Configuration of Battery

A nonaqueous electrolyte secondary battery according to the present invention configured of the positive electrode, the negative electrode, the separator, and the nonaqueous electrolyte solution, each of which is explained above, may have various shapes, such as a cylinder shape and a laminated shape.

Even when any of the shapes is adopted, the nonaqueous electrolyte secondary battery is completed in such a manner that the positive electrode and the negative electrode are laminated via the separator to form an electrode body; the obtained electrode body is impregnated with the nonaqueous electrolyte solution; connection between a positive electrode current collector and a positive electrode terminal connected with an exterior, and between a negative electrode current collector and a negative electrode terminal connected with an exterior are established using such as a lead for current collecting; and sealing thereof in a battery case is performed.

(3-f) Characteristics

When a nonaqueous electrolyte secondary battery using the positive electrode active material according to the present invention is made into, for example, a 2032 type coin battery, a high initial discharge capacity of not less than 220 mAh/g, not less than 250 mAh/g in more preferable embodiment, a low positive electrode resistance, and a high cycle capacity maintenance rate are achieved, and thus excellent characteristics as a positive electrode active material for nonaqueous electrolyte secondary batteries are exhibited. Also, it can be said that, compared with positive electrode active materials of conventional lithium cobalt oxide or lithium nickel oxide, the positive electrode active material according to the present invention has an equivalent level of thermal stability and also no problem in safety.

EXAMPLES

Hereinafter, Examples according to the present invention and Comparative Examples will be explained in detail. Note that, unless otherwise specified, each sample of extra-pure reagents manufactured by Wako Pure Chemical Industries, Ltd. was used in production of compound hydroxide particles, a positive electrode active material, and a secondary battery through all Examples and Comparative Examples.

Example 1

Coprecipitation Step

First, while a reaction vessel was filled half full with pure water, followed by stirring, nitrogen gas was circulated to reduce an oxygen concentration in the reaction vessel to not more than 5% by volume, and a temperature in the vessel was set at 40 degrees C., and 25% by mass of a sodium hydroxide solution and 25% by mass of aqueous ammonia were added in proper amount to the pure water to adjust a pH of the solution to 12.8 at a reference solution temperature of 25 degrees C. (Note that all the pH was adjusted at a reference solution temperature of 25 degrees C.) and to adjust an ammonia concentration in the solution to 10 q/L, whereby a reaction solution was prepared. Thereto, 1.8 mol/L of a solution (mixed solution A) obtained by dissolving nickel sulfate, cobalt sulfate, and manganese sulfate (metal element molar ratio of Ni:Co:Mn=2:1:7) in pure water, and the above-mentioned aqueous ammonia and the sodium hydroxide were added at a constant flow rate, and while the pH value was controlled to 12.8 (nucleation pH), crystallization was performed for 2 minutes and 30 seconds.

Then, only the sodium hydroxide solution temporarily stopped being supplied until the pH value reached 11.6 (nuclear growth pH), and after the pH value reached 11.6, supply of the sodium hydroxide solution was resumed. Subsequently, while the pH was held at 11.6, crystallization was continued for 2 hours, and, at the point in time when the reaction vessel was filled to capacity, the crystallization was stopped and stirring was stopped, followed by still standing, whereby precipitation of a resulting product was accelerated. A half amount of a supernatant solution was taken out, and then crystallization was resumed. Furthermore, crystallization was performed for another 2 hours (4 hours in total) and then terminated, followed by water-washing, filtering and drying the product.

Using the above-mentioned method, composite hydroxide represented by $Ni_{0.20}Co_{0.10}Mn_{0.70}(OH)_{2+\beta}$ ($0 \le \beta \le 0.5$) was obtained.

(Heat Treatment, Burning Process)

After heat-treating the obtained composite hydroxide at 150 degrees C. in an air atmosphere for 12 hours, lithium carbonate was weighed so as to achieve Li/Me=1.5, and, using a shaker mixer (TURBULA TypeT2C manufactured by Willy A. Bachofen (WAB)), the heat-treated composite hydroxide was sufficiently mixed with the lithium carbonate to obtain a mixture thereof. This mixture was burned at 900 degrees C. in an air current (oxygen: 21% by volume) for 10 hours, and furthermore pulverized to obtain a positive electrode active material for nonagueous electrolyte secondary batteries.

A crystal structure of the obtained, positive electrode active material for nonagueous electrolyte secondary batteries was observed by an X-ray diffraction (XRD) apparatus, and as a result, the presence of $Li_2MnO_3$ and $LiMO_2$ was confirmed from a XRD pattern. Note that, when calculated from the composition, a rate of $Li_2MnO_3$ to $LiMO_2$ was 0.5:0.5.

Figure 3:
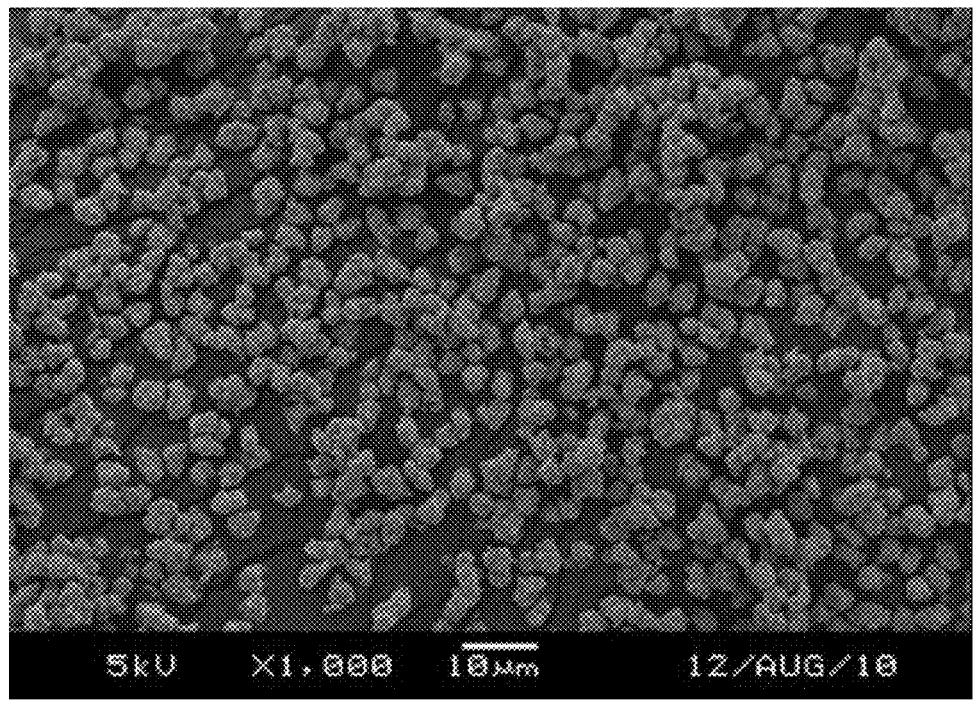
FIG. 3 shows a SEM photograph of a positive electrode active material obtained in Example 1 (observation magnification of 1,000×).

Table 1 shows an average particle diameter, a value of [$(d90-d_{10})$/average-particle-diameter], and an initial discharge capacity value of the obtained composite hydroxide and the obtained positive electrode active material for non-aqueous electrolyte secondary batteries. FIG. 3 shows SEM (scanning electron microscope JSM-6360LA, manufactured by JEOL Ltd.) observation results of the positive electrode active material.

Figure 4:
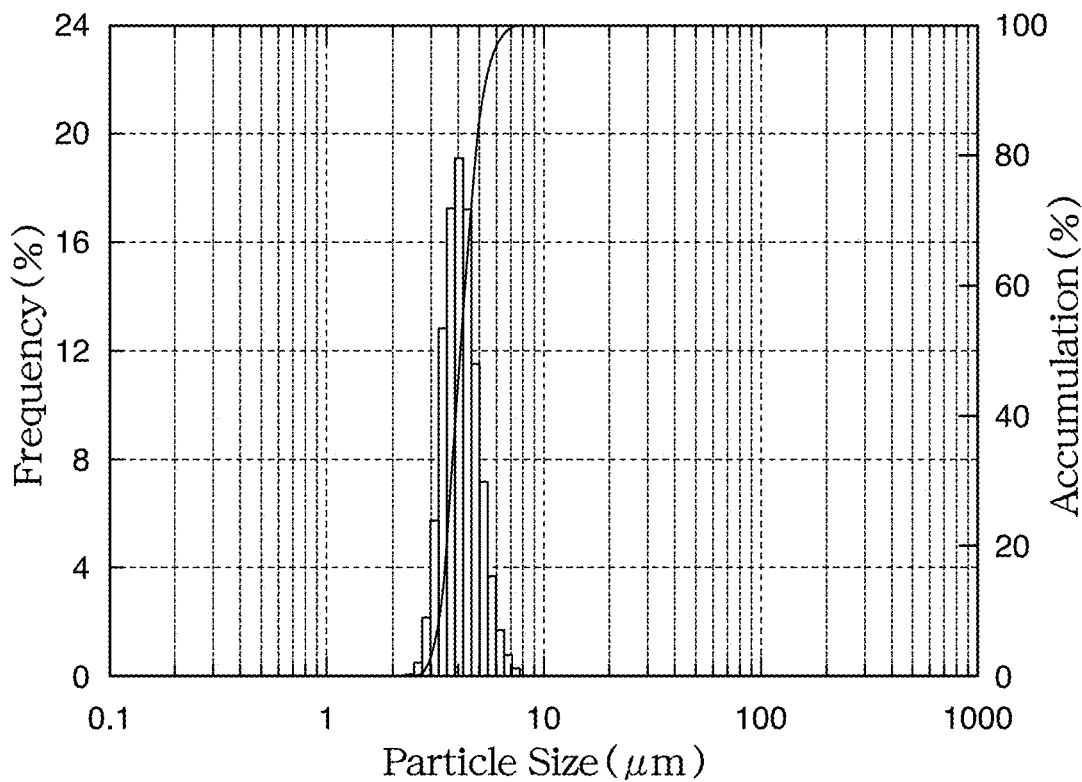
FIG. 4 shows a particle-size distribution of positive electrode active material obtained in Example 1.

Note that the average particle diameter was measured by a laser diffraction scattering type particle-size-distribution measuring apparatus (Microtrac HRA, manufactured by Nikkiso Co., Ltd.), and FIG. 4 shows the results of the particle-size-distribution measurement.

(Battery Evaluation)

The obtained positive electrode active material for non-aqueous electrolyte secondary batteries was evaluated in such a manner that a battery was produced as follows and a charge-and-discharge capacity thereof was measured.

Figure 5:
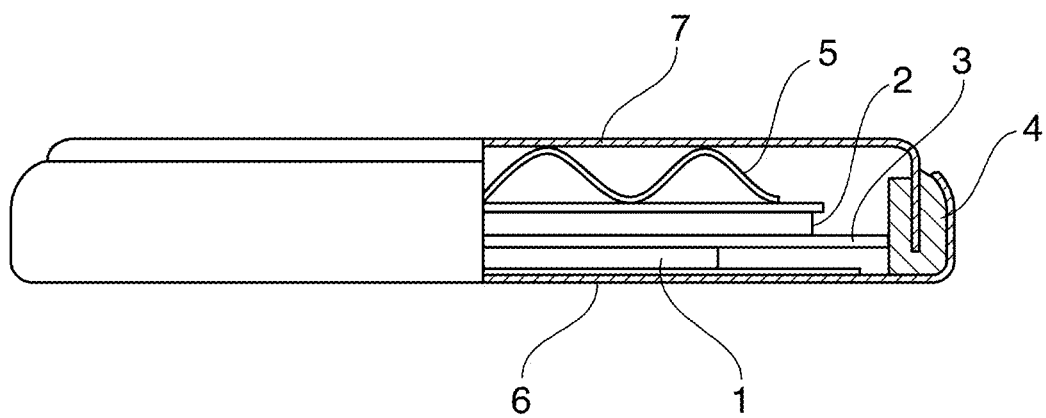
FIG. 5 shows a sectional view of a coin cell used for evaluation in Examples.

To produce the positive electrode 1 (an electrode for evaluation) illustrated in FIG. 5, 52.5 mg of the positive electrode active material for nonaqueous electrolyte secondary batteries, 15 mg of acetylene black, and 7.5 mg of polytetrafluoroethylene resin (PTFE) were mixed, and press-formed at a pressure of 100 MPa to be 11 mm in diameter and 100 μm in thickness. The produced positive electrode 1 was dried in a vacuum dryer at 1.20 degrees C. for 12 hours. Then, using this positive electrode 1, a 2032 type coin battery B was produced in a glove box having an Ar atmosphere in which a dew point was controlled at −80 degrees C.

For a negative electrode 2, Li metal having a diameter of 17 mm and a thickness of 1 mm was used, while, for an electrolyte solution, there was used a liquid mixture (manufactured by Tomiyama Pure Chemical Industries, Limited) having a ratio of ethylene carbonate (BC) to diethyl carbonate (DEC) of 3:7, wherein 1 M of LiPF6 was used as a supporting electrolyte. For a separator 3, there was used a porous polyethylene film having a film thickness of 25 μm. Also, a coin battery B, comprising a gasket 4 and a wave washer 5, was assembled to be a coin-shaped battery with a positive electrode can 6 and a negative electrode can 7.

An initial discharge capacity of the obtained coin type battery B was evaluated by a charge-and-discharge test in such a manner that the obtained coin type battery B was left to stand for 24 hours after the assembly thereof, and then after an open circuit voltage (OCV) was stabilized, with setting a current density for a positive electrode at 0.1 mA/cm2, charging was performed until the voltage reached a cut-off voltage of 4.8 V, and then, after a 1-hour suspension, discharging was performed until the voltage reached a cut-off voltage of 2.0 V and a discharge capacity at this point was measured.

Also, in order to measure a durable characteristic, 200 cycles of charge-and-discharge cycling were repeated under conditions of a current density enough to complete charging for 1 hour in a voltage range of 3.0 to 4.6 V and a temperature of 40 degrees C., and then a capacity maintenance rate was calculated from a ratio of a discharge capacity at the initial period to a discharge capacity after the cycling.

For the measurement of a charge-and-discharge capacity, a multi-channel voltage/current generator (manufactured by Fujitsu Access Limited) was used.

As a result of the initial charge-and-discharge test, an initial discharge capacity of a secondary battery using the obtained positive electrode active material for nonagueous electrolyte secondary batteries was 269 mAh/g. A capacity maintenance rate after the 200 cycles was 73.1%.

Example 2

A positive electrode active material for nonagueous electrolyte secondary batteries was obtained and evaluated in the same manner as in Example 1, except that a ratio Li/Me was 1.41.

Table 1 shows a composition ratio of Ni:Co:Mn of the obtained positive electrode active material for nonagueous electrolyte secondary batteries, a ratio Li/Me, a ratio of Li2MnO3 to LiMO2 calculated from the composition, an initial discharge capacity, and a capacity maintenance rate.

Example 3

A positive electrode active material for nonagueous electrolyte secondary batteries was obtained and evaluated in the same manner as in Example 1, except that a ratio Li/Me was 1.55.

Table 1 shows a composition ratio of Ni:Co:Mn of the obtained positive electrode active material for nonagueous electrolyte secondary batteries, a ratio Li/Me, a ratio of $Li_2MnO_3$ to $LiMO_2$ calculated from the composition, an initial discharge capacity, and a capacity maintenance rate.

Example 4

A positive electrode active material for nonaqueous electrolyte secondary batteries was obtained and evaluated in the same manner in Example 1, except that the composition was changed to a molar ratio of Ni:Co:Mn of 1:3:6.

Table 1 shows a composition ratio of Ni:Co:Mn of the obtained positive electrode active material for nonaqueous electrolyte secondary batteries, a ratio Li/Me, a ratio of $Li_2MnO_3$ to $LiMO_2$ calculated from the composition, an initial discharge capacity, and a capacity maintenance rate.

Example 5

A positive electrode active material for nonagueous electrolyte secondary batteries was obtained and evaluated in the same manner as in Example 1, except that the composition was changed to a molar ratio of Ni:Co:Mn of 3:1:6.

Table 1 shows a composition ratio of Ni:Co:Mn of the obtained positive electrode active material for nonagueous electrolyte secondary batteries, a ratio Li/Me, a ratio of Li2MnO3 to LiMO2 calculated from the composition, an initial discharge capacity, and a capacity maintenance rate.

Example 6

A positive electrode active material for nonaqueous electrolyte secondary batteries was obtained and evaluated in the same manner as in Example 1, except that the composition was changed to a molar ratio of Ni:Co:Mn of 4:1:5.

Table 1 shows a composition ratio of Ni:Co:Mn of the obtained positive electrode active material for nonaqueous electrolyte secondary batteries, a ratio Li/Me, a ratio of Li2MnO3 to LiMO2 calculated from the composition, an initial discharge capacity, and a capacity maintenance rate.

Comparative Example 1

A positive electrode active material for nonaqueous electrolyte secondary batteries was obtained and evaluated in the same manner as in Example 1, except that the composition was changed to a molar ratio of Ni:Co:Mn of 2:0:8, and a ratio Li/Me was 1.3.

Table 1 shows a composition ratio of Ni:Co:Mn of the obtained positive electrode active material for nonaqueous electrolyte secondary batteries, a ratio Li/Me, a ratio of Li2MnO3 to LiMO2 calculated from the composition, and an initial discharge capacity. Note that a capacity maintenance rate was not measured since the initial discharge capacity was low.

Comparative Example 2

A positive electrode active material for nonaqueous electrolyte secondary batteries was obtained and evaluated in the same manner as in Example 1, except that the composition was changed to a molar ratio of Ni:Co:Mn of 2:0:8, and a ratio Li/Me was 1.6.

Table 1 shows a composition ratio of Ni:Co:Mn of the obtained positive electrode active material for nonaqueous electrolyte secondary batteries, a ratio Li/Me, a ratio of Li2MnO3 to LiMO2 calculated from the composition, and an initial discharge capacity. Note that a capacity maintenance rate was not measured since the initial discharge capacity was low.

Comparative Example 3

A positive electrode active material for nonaqueous electrolyte secondary batteries was obtained and evaluated in the same manner as in Example 1, except that the composition was changed to a molar ratio of Ni:Co:Mn of 5:1:4.

Table 1 shows a composition ratio of Ni:Co:Mn of the obtained positive electrode active material for nonaqueous electrolyte secondary batteries, a ratio Li/Me, a ratio of Li2MnO3 to LiMO2 calculated from the composition, and an initial discharge capacity. Note that a capacity maintenance rate was not measured since the obtained positive electrode active material had a Li-excess composition in which unreacted Li remains.

Comparative Example 4

A positive electrode active material for nonaqueous electrolyte secondary batteries was obtained and evaluated in the same manner as in Example 1, except that the composition was changed to a molar ratio of Ni:Co:Mn of 1:1:8.

Table 1 shows a composition ratio of Ni:Co:Mn of the obtained positive electrode active material for nonaqueous electrolyte secondary batteries, a ratio Li/Me, a ratio of Li2MnO3 to LiMO2 calculated from the composition, and an initial discharge capacity. Note that a capacity maintenance rate was not measured since a spinel phase was formed.

Comparative Example 5

A positive electrode active material for nonaqueous electrolyte secondary batteries was obtained and evaluated in the same manner as in Example 1, except that the composition was changed to a molar ratio of Ni:Co:Mn of 1:1:8.

Table 1 shows a composition ratio of Ni:Co:Mn of the obtained positive electrode active material for nonaqueous electrolyte secondary batteries, a ratio Li/Me, a ratio of Li2MnO3 to LiMO2 calculated from the composition, and an initial discharge capacity. Note that a capacity maintenance rate was not measured since a spinel phase was formed.

Comparative Example 6

A positive electrode active material for nonaqueous electrolyte secondary batteries was obtained and evaluated in the same manner as in Example 1, except that a burning temperature was 1050 degrees C. Table 1 shows a composition ratio of Ni:Co:Mn of the obtained positive electrode active material for nonaqueous electrolyte secondary batteries, a ratio Li/Me, a ratio of Li2MnO3 to LiMO2 calculated from the composition, an initial discharge capacity, and a capacity maintenance rate after the 200 cycles.

Comparative Example 7

A positive electrode active material for nonaqueous electrolyte secondary batteries was obtained and evaluated in the same manner as in Example 1, except that crystallization was performed for 4 minutes while a pH was controlled to 14.5 (nucleation pH) in the nucleation stage. Table 1 shows a composition ratio of Ni:Co:Mn of the obtained positive electrode active material for nonaqueous electrolyte secondary batteries, a ratio Li/Me, a rate of Li2MnO3 to LiMO2 calculated from the composition, an initial discharge capacity, and a capacity maintenance rate after the 200 cycles.

Comparative Example 8

A positive electrode active material for nonaqueous electrolyte secondary batteries was obtained and evaluated in the same manner as in Example 1, except that a pH was controlled to a constant value of 12.0 (without the nucleation stage), and a total crystallization time was 3 hours. Table 1 shows a composition ratio of Ni:Co:Mn of the obtained positive electrode active material for nonaqueous electrolyte secondary batteries, a ratio Li/Me, a ratio of Li2MnO3 to LiMO2 calculated from the composition, an initial discharge capacity, and a capacity maintenance rate after the 200 cycles.

Comparative Example 9

A positive electrode active material for nonaqueous electrolyte secondary batteries was obtained and evaluated in the same manner as in Example 1, except that, using a 34-L cylinder type reaction vessel equipped with a stirrer and a overflow pipe, the mixed solution A and 25% aqueous ammonia were added to said reaction vessel at a flow rate of 30 cm3 per minute and 3 cm3 per minute, respectively, whereby a pH was controlled to 11.5 to 12.0, and, after a stationary state was achieved inside the reaction vessel, composite hydroxide particles were continuously collected from the overflow pipe; and, using a wet cyclone (hydrocyclone, NHC-1, manufactured by Japan Chemical Engineering & Machinery Co., Ltd.), a supply pressure was raised thereby to remove coarse powder from the collected composite hydroxide particles, and then supply pressure was reduced thereby to remove fine particles therefrom.

Table 1 shows a composition ratio of Ni:Co:Mn of the obtained positive electrode active material for nonaqueous electrolyte secondary batteries, a ratio Li/Me, a ratio of $Li_2MnO_3$ to $LiMO_2$ calculated from the composition, an initial discharge capacity, and a capacity maintenance rate after the 200 cycles.

TABLE 1

|  | Ratio of Ni:Co:Mn | Average particle diameter [μm] | $(d_{90}-d_{10})$/average-particle-diameter | Li/Me | Ratio of $Li_2MnO_3$:$LiMO_2$ | Initial discharged capacity [mAh/g] | Capacity maintenance rate [%] |
|---|---|---|---|---|---|---|---|
| Example 1 | 2:1:7 | 4.4 | 0.46 | 1.5 | 0.5:0.5 | 269 | 73.1 |
| Example 2 | 2:1:7 | 4.3 | 0.46 | 1.41 | 0.41:0.59 | 235 | 72.6 |
| Example 3 | 2:1:7 | 4.5 | 0.46 | 1.55 | 0.55:0.45 | 231 | 72.6 |
| Example 4 | 1:3:6 | 5.4 | 0.52 | 1.5 | 0.5:0.5 | 269 | 71.6 |
| Example 5 | 3:1:6 | 4.5 | 0.47 | 1.5 | 0.5:0.5 | 238 | 72.1 |
| Example 6 | 4:1:5 | 4.2 | 0.46 | 1.5 | 0.5:0.5 | 236 | 71.8 |
| Comparative Example 1 | 2:0:8 | 4.4 | 0.46 | 1.3 | 0.3:0.7 | 157 | — |
| Comparative Example 2 | 2:0:8 | 4.4 | 0.46 | 1.6 | 0.6:0.4 | 145 | — |
| Comparative Example 3 | 5:1:4 | 4.3 | 0.47 | 1.5 | Unreacted Li remaining | 215 | — |
| Comparative Example 4 | 1:1:8 | 4.4 | 0.49 | 1.5 | Spinal phase formed | 65 | — |
| Comparative Example 5 | 1:1:8 | 4.4 | 0.49 | 1.5 | Spinal phase formed | 41 | — |
| Comparative Example 6 | 2:1:7 | 9.8 | 0.65 | 1.5 | 0.5:0.5 | 184 | 55.9 |
| Comparative Example 7 | 2:1:7 | 2.8 | 0.48 | 1.5 | 0.5:0.5 | 275 | 62.5 |
| Comparative Example 8 | 2:1:7 | 2.9 | 0.62 | 1.5 | 0.5:0.5 | 268 | 63.2 |
| Comparative Example 9 | 2:1:7 | 6.5 | 0.55 | 1.5 | 0.5:0.5 | 233 | 59.6 |

Table 1 indicates that each of Examples having the particle-size distribution and the composition ratio according to the present invention achieves a higher initial discharge capacity. On the other hand, in Comparative Example 1 and Comparative Example 2, each having a more amount of Mn with respect to an amount of Ni, even if Li/Me is changed, the initial discharge capacity is low.

Also, in Comparative Example 3, having a less amount of Mn, the initial discharge capacity is higher than those of Comparative Example 1 and Comparative Example 2, but unreacted Li is present, thereby leading to a problem with thermal safety. Furthermore, in Comparative Example 4 and Comparative Example 5, each having a more amount of Mn with respect to an amount of Ni, a spinel phase is formed, thereby considerably reducing the initial discharge capacity.

It is understood that, in Comparative Examples 7 and 8, each having a smaller average particle diameter, which is less than 3 μm, regardless of the particle-size distribution, a reaction area is larger and therefore a discharge capacity can be secured while a capacity deterioration following the cycling is more significant. Furthermore, it is understood that, also in Comparative Example 9, having an average particle diameter of 6.5 μm, which is within a range of the present invention, while having a wider particle-size distribution, non-uniform reaction due to variation, in particle size causes finer particles to deteriorate earlier, whereby a capacity deterioration following the cycling is more significant.

Example 7

Production of Composite Hydroxide Particles

Composite hydroxide particles were produced as follows.
(Nucleation Stage)
First, while a reaction vessel (34 L) was filled, half full with water, followed by stirring, a temperature in the vessel was set at 40 degrees C. The inside of the reaction vessel at this time was filled with an air atmosphere (oxygen concentration: 21% by volume). To the water in the reaction vessel, 25% by mass of a sodium hydroxide solution and 25% by mass of aqueous ammonia were added in proper amount to adjust a pH of a reaction solution in the vessel to 12.8 at a reference solution temperature of 25 degrees C. Furthermore, an ammonia concentration in said reaction solution was adjusted to 10 g/L to prepare a pre-reaction solution was prepared.

Next, nickel sulfate, cobalt sulfate, and manganese sulfate were dissolved in water to prepare 1.8 mol/L of a mixed solution. This mixed solution was adjusted as to have a metal element molar ratio of Ni:Co:Mn of 0.167:0.167:0.666.

This mixed solution was added to the pre-reaction solution in the reaction vessel at a rate of 88 ml/min to obtain a reaction solution. At the same time, 25% by mass of aqueous ammonia and 25% by mass of a sodium hydroxide solution were also added to the reaction solution at a constant flow rate, and while a pH value of the reaction solution in the vessel was controlled to 12.8 (nucleation pH) in a state where an ammonia concentration in the reaction solution (a solution for nucleation) was maintained at the above-mentioned value, crystallization was performed for 2 minutes and 30 seconds to carry out nucleation.

(Particle Growth Stage)
After completion of the nucleation, only the 25% by mass of the sodium hydroxide solution temporarily stopped being supplied until a pH value of the reaction solution reached 11.6 at a reference solution temperature of 25 degrees C. After the pH value of the reaction solution reached 11.6, supply of the 25% by mass of the sodium hydroxide solution to the reaction solution (a solution for particle growth) was resumed, and, while an ammonia concentration was maintained at the above-mentioned value and the pH value was controlled to 11.6 at a reference solution temperature of 25 degrees C., crystallization continued to be performed for 30 minutes for particle growth, and then the supply of the solution was stopped once, and nitrogen gas was circulated at 5 L/min until an oxygen concentration in a space between a reaction vessel lid and a liquid surface in an inner space of the reaction vessel was not more than 0.2% by volume. Then, the supply of the solution was resumed, and crystallization was performed for 2 hours in total from the start of the particle growth.

When the reaction vessel was filled to capacity, the crystallization was stopped and, at the same time, stirring was stopped, followed by still standing, whereby precipitation of a product was accelerated. Then, after a half amount of supernatant solution was taken out from the reaction vessel, crystallization was resumed and performed for another 2 hours (4 hours in total), and then terminated.

Then, the product was water-washed, filtered and dried to obtain composite hydroxide particles. Note that the above-mentioned switching from the air atmosphere to the nitrogen atmosphere was performed at the point in time when 12.5% of a total time of the particle growth process had passed since the particle growth process was started.

In the above-mentioned crystallization, the pH was controlled by adjusting a supply flow rate of a sodium hydroxide solution with a pH controller, and fluctuated within a range of a predetermined value of +/−0.2.

[Analysis of Composite Hydroxide]

A sample of the obtained composite hydroxide was dissolved with inorganic acid, and then the chemical analysis was conducted on the sample by ICP emission spectrometry, and as a result, the composition was $Ni_{0.169}Cu_{0.164}Mn_{0.667}(OH)_{2+a}$ ($0 \leq a \leq 0.5$).

Furthermore, an average particle diameter and a value indicating a particle-size distribution [$(d_{90}-d_{10})$/average-particle-diameter] of this composite hydroxide were calculated from a volume integrated-value measured using a laser diffraction scattering type particle-size-distribution measuring apparatus (Microtrac HRA, manufactured by Nikkiso Co., Ltd.). As a result, the average particle diameter was 5.8 μm and the value [$(d_{90}-d_{10})$/average-particle-diameter] was 0.46.

Next, the obtained composite hydroxide particles were observed by SEM (scanning electron microscope S-4700, manufactured by Hitachi High-Technologies Corporation) (magnification of 1,000×), and it was confirmed that the composite hydroxide particles had an approximately spherical shape and an approximately uniform particle diameter. FIG. 6 shows the SEM observation result.

Also, a sample of the obtained composite hydroxide particles were embedded to a resin and underwent cross-section polisher processing, and observed by a SEM at a magnification of 10,000×. As a result, it was confirmed that the composite hydroxide particle was composed of a secondary particle, and said secondary particle was composed of a center portion comprising needle-like and thin-plate-like fine primary particles (particle diameter of approximately 0.3 μm) and a outer shell portion comprising larger plat-like primary particles than said fine primary particles (particle diameter of approximately 0.6 μm) outside said center portion.

FIG. 7 shows the result of the SEM observation of this cross-section. A thickness of the outer shell portion with respect to a diameter of the secondary particle was measured from the SEM observation of this cross-section, and as a result, was 14%.

[Production of Positive Electrode Active Material]

The composite hydroxide particles were heat-treated at 700 degrees C. for 6 hours in an air current (oxygen: 21% by volume), thereby being converted into composite oxide particles and collected.

Lithium carbonate was weighed so as to achieve Li/Me=1.50, and mixed with the above-mentioned composite oxide particles to prepare a lithium mixture. The mix was performed using a shaker mixer (TURBULA TypeT2C, manufactured by Willy A. Bachofen (WAB)).

After performing calcination at 500 degrees C. for 4 hours in an air atmosphere (oxygen: 21% by volume), the obtained lithium mixture was burned at 950 degrees C. for 10 hours and cooled, and then pulverized to obtain a positive electrode active material.

[Analysis of Positive Electrode Active Material]

A particle-size distribution of the obtained positive electrode active material was measured by the same method as that used for the composite hydroxide particles, and as a result, the positive electrode active material had an average particle diameter of 5.3 μm and a value [$(d90-d10)$/average-particle-diameter] of 0.46.

Also, a SEM observation and a cross-sectional SEM observation of the positive electrode active material was performed by the same method as that used for the composite hydroxide particles, and as a result, it was confirmed that the obtained positive electrode active material had an approximately spherical shape and an approximately uniform particle diameter. FIG. 8 shows the SEM observation result of the positive electrode active material.

On the other hand, it was confirmed by a cross-sectional SEM observation that this positive electrode active material had a hollow structure comprising an outer shell portion composed of sintered primary particles and a hollow portion inside said outer shell portion. FIG. 9 shows the cross-sectional SEM observation result of the positive electrode active material. A thickness of the outer shell portion with respect to a diameter of the positive electrode active material was measured from this observation, and as a result, was 13%.

A specific surface area of the obtained positive electrode active material was measured by a specific surface area measuring apparatus using a fluidized gas absorption method (Multisorb, manufactured by Yuasa Ionics Co., Ltd.), and, as a result, was 1.5 m2/g.

Furthermore, a composition analysis of the positive electrode active material by ICP emission spectrometry was conducted as is the case with the analysis of the composite hydroxide, and as a result, it was confirmed that the composition was Li1.50Ni0.167Co0.167Mn0.66602.5.

[Production and Evaluation of Secondary Battery]

A 2032 type coin battery produced as in Example 1 was used for evaluation of the obtained positive electrode active material.

[Battery Evaluation]

An initial discharge capacity, a cycle capacity maintenance rate, and a positive electrode resistance, each being used for evaluating the performance of the obtained coin type battery, were defined as follows.

The initial discharge capacity was obtained in such a manner that a coin type battery was left to stand for approximately hours after the production thereof, and after an OCV (open circuit voltage) was stabilized, with setting a current density for a positive electrode to 0.1 mA/cm$^2$, charging was performed until the voltage reached a cut-off voltage of 4.7 V, and then, after a 1-hour suspension, discharging was performed until the voltage reached a cut-off voltage of 2.5 V, and a discharge capacity at this point was considered as the initial discharge capacity.

The cycle capacity maintenance rate was obtained in such a manner that there was repeated 200 times a cycle in which, with setting a current density for a positive electrode to 2 mA/cm2, charging was performed until the voltage reached 4.7 V and discharging was performed until the voltage reached 3.0 V; and then a ratio of a discharge capacity after the repetition of charge and discharge to an initial discharge capacity was calculated and considered as the capacity maintenance rate.

For the measurement of the charge-and-discharge capacity, a multi-channel voltage/current generator (R6741A, manufactured by ADVANTEST CORPORATION) was used.

The positive electrode resistance was evaluated as follows.

Figure 10:
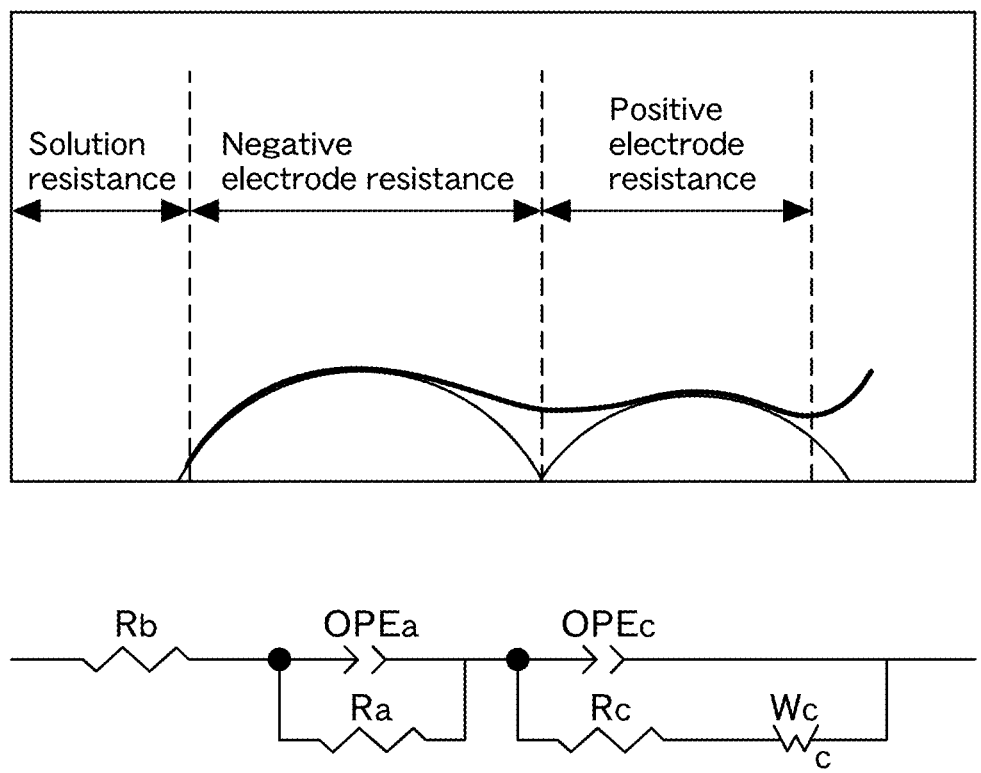
FIG. 10 is a schematic explanatory diagram showing a measurement example of impedance evaluation and an equivalent circuit used for analysis.

A coin type battery was charged at a charging electric potential of 4.1V, and, using a frequency response analyzer and a potentiogalvanostat (1255B, manufactured by Solartron), measurement was performed by an alternating-current-impedance method, and as a result, a Nyquist plot shown in FIG. 10 was obtained. This Nyquist plot is expressed as a sum of characteristic curves showing a solution resistance, a negative electrode resistance and a capacity thereof, and a positive electrode resistance and a capacity thereof, and thus, based on this Nyquist plot, a fitting calculation was performed using an equivalent circuit to calculate a value of the positive electrode resistance.

Battery evaluation was performed for a coin type battery having a positive electrode formed using the above-mentioned positive electrode active material, and as a result, the initial discharge capacity was 272 mAh/g and the positive electrode resistance was 37Ω. Furthermore, the capacity maintenance rate after the 200 cycles was 80%.

Table 2 shows characteristics of the composite hydroxide obtained in Example 7, while Table 3 shows characteristics of the positive electrode active material and each of the evaluations or the coin type battery manufactured using the positive electrode active material. Furthermore, also as for Examples 8 to 15 and Comparative Examples 10 to 14 shown below, the same contents are shown in Table 2 and 3.

Example 8

A positive electrode active material for nonaqueous electrolyte secondary batteries was obtained and evaluated, in the same manner as in Example 7, except that lithium hydroxide was mixed with composite oxide particles so as to achieve Li/Me=1.70, and a burning temperature was 850 degrees C. A composition of the obtained positive electrode active material was confirmed to be $Li_{1.70}Ni_{0.167}Co_{0.167}Mn_{0.666}O_{2.7}$.

Example 9

A positive electrode active material for nonaqueous electrolyte secondary batteries was obtained and evaluated in the same manner as in Example 7, except that, in the particle growth process in the composite hydroxide particle production process, the switching from the air atmosphere to the nitrogen atmosphere was performed at the point in time when 6.25% of a total time of the particle growth process had passed. Note that compositions of the obtained composite hydroxide particles and the obtained positive electrode active material were the same as those of Example 7, and as is the case with Example 1, the composite hydroxide particle was composed of a center portion comprising needle-like fine primary particles (particle diameter of approximately 0.4 μm) and an outer shell portion comprising larger plate-like primary particles than said fine primary particles (particle diameter of approximately 0.8 μm) outside said center portion.

Example 10

A positive electrode active material for nonaqueous electrolyte secondary batteries was obtained and evaluated in the same manner as in Example 7, except that, in the composite hydroxide particle production process, in addition to nickel sulfate and manganese sulfate, sodium tungstate was dissolved in water to form a 1.8-mol/L mixed solution. Note that this mixed solution was adjusted so as to have a metal element molar ratio of Ni:Co:Mn:W of 0.167:0.167:0.661:0.005. A composition of the obtained composite hydroxide was $Ni_{0.167}Co_{0.166}Mn_{0.662}W_{0.005}(OH)_{2+a}$ (0≤a≤0.5). Also, a composition of the obtained positive electrode active material was confirmed to be $Li_{1.50}Ni_{0.167}Co_{0.166}Mn_{0.662}W_{0.005}O_{2.5}$.

Example 11

A positive electrode active material for nonaqueous electrolyte secondary batteries was obtained and evaluated in the same manner as in Example 7, except that lithium hydroxide was mixed with composite oxide particles to achieve Li/Me=1.25. A composition of the obtained positive electrode active material was confirmed to be $Li_{1.25}Ni_{0.167}Co_{0.167}Mn_{0.666}O_{2.25}$.

Example 12

A positive electrode active material for nonaqueous electrolyte secondary batteries was obtained and evaluated in the same manner as in Example 7 except that, in the composite hydroxide particle production process, a temperature in the vessel was 50 degrees C. and the ammonia concentration was 15 q/L. Note that compositions of the obtained composite hydroxide particles and the obtained positive electrode active material were the same as those of Example 7, and as is the case with Example 7, the composite hydroxide particle was composed of a center portion comprising needle-like fine primary particles (particle diameter of approximately 0.3 μm) and an outer shell portion comprising larger plate-like primary particles than said fine primary particles (particle diameter of approximately 0.8 μm) outside said center portion.

Example 13

A positive electrode active material for nonaqueous electrolyte secondary batteries was obtained and evaluated in the same manner as in Example 7, except that, in the particle growth process in the composite hydroxide particle production process, the switching from the air atmosphere to the nitrogen atmosphere was performed at the point in time when 25% of a total time of the particle growth process had passed. Note that compositions of the obtained composite hydroxide particles and the obtained positive electrode active material were the same as those of Example 7, and as is the case with Example 7, the composite hydroxide particle was composed or a center portion comprising needle-like fine primary particles (particle diameter of 0.3 μm) and an outer shell portion comprising larger plate-like primary particles than said fine primary particles (particle diameter of 0.5 μm) outside said center portion.

Example 14

A positive electrode active material was obtained in the same manner as in Example 7, except that, when composite hydroxide obtained in the same manner as in Example 7 was mixed with lithium carbonate, tungstic oxide was added thereto so as to achieve the same active material composition as that of Example 10, and burned. Note that a composition of the obtained active material was the same as that of Example 10.

Example 15

A positive electrode active material was obtained in the same manner as in Example 7, except that composite hydroxide obtained in the same manner as in Example 7 was dispersed in an ammonium tungstate solution so as to achieve 150 g/L, and thereby slurried, and then the slurry was sprayed and dried using a micromist dryer (MDL-050M, manufactured by Fulisaki Electric Co., Ltd.), whereby composite hydroxide coated with an ammonium tungstate salt was obtained. Note that a composition of the obtained active material was confirmed to be the same as that of Example 10, and a larger amount of tungsten were confirmed to be present in the vicinity of surfaces of active material particles.

Comparative Example 10

Crystallization was performed by a common method in such a manner that, using a reaction vessel for continuous crystallization equipped with an overflow pipe in the upper part thereof, while a pH of a reaction solution was maintained at a constant value 11.0 at a reference solution temperature of 25 degrees C. in an air atmosphere, a mixed solution, an ammonia solution, and a sodium hydroxide solution, each being the same as those of Example 7, were continuously added at a constant flow rate, and overflowing slurry was collected continuously. A positive electrode active material was obtained in the same manner as in Example 7, except that, with setting an average residence time in the reaction vessel at 10 hours, after an equilibrium state was achieved inside the reaction vessel, slurry was collected and solid-liquid separated, whereby a crystallized material was obtained.

Note that compositions of the obtained, composite hydroxide and the obtained positive electrode active material were the same as those of Example 7. The whole of the composite hydroxide particles was composed of the same primary particles as those in the outer shell portion of Example 7, whereby the positive electrode active material was particles with a solid-core structure having a high density.

Comparative Example 11

A positive electrode active material for nonaqueous electrolyte secondary batteries was obtained and evaluated in the same manner as in Example 7, except that a pH in each of the nucleus formation process and the particle growth stage was maintained at a constant value 11.6 at a reference solution temperature of 25 degrees C. During crystallization, nitrogen gas was circulated at 5 L/min in an inner space of a reaction vessel to maintain an oxygen concentration of not more than 0.2% by volume in a space between a lid of the reaction vessel and a liquid surface. Note that compositions of the obtained composite hydroxide and the obtained positive electrode active material were the same as those of Example 1. The whole of the composite hydroxide particles was composed of the same primary particles as those in the outer shell portion of Example 7, whereby the positive electrode active material was particles with a solid-core structure having a high density.

Comparative Example 12

Nickel cobalt manganese composite hydroxide was obtained in the same manner as in Example 7, except that a pH in each of the nucleus formation process and the particle growth stage was maintained at a constant value 12.6 at a reference solution temperature of 25 degrees C. During crystallization, nitrogen gas was circulated at 5 L/min in an inner space of a reaction vessel to maintain an oxygen concentration of not more than 0.2% by volume in a space between a lid of the reaction vessel and a liquid surface.

However, a new nucleus was formed during the whole period of the crystallization reaction, whereby indefinite-shaped particles having a wide particle-size distribution and including a gel-like precipitate were formed, and therefore solid liquid separation was difficult to be performed and accordingly the treatment was stopped.

Comparative Example 13

A positive electrode active material for nonaqueous electrolyte secondary batteries was obtained and evaluated in the same manner as in Example 7, except that a burning temperature was 1100 degrees C. Compositions of the obtained composite hydroxide and the obtained positive electrode active material were the same as those of Example 7, but particles considerably grew, and thus a specific surface area was reduced to 0.8 m2/g, whereby considerable reduction in initial capacity and positive electrode resistance was caused.

Comparative Example 14

A positive electrode active material for nonagueous electrolyte secondary batteries was obtained and evaluated in the same manner as in Example 7, except that, in the particle growth process, the switching from the air atmosphere to the nitrogen atmosphere was performed at the point in time when 50% of a total time of the particle growth process had passed since the particle growth process was started.

The composite hydroxide had an insufficient thickness of the outer shell portion, whereby sintering of secondary particles progressed in the burning stage for obtaining a positive electrode active material, and thus an active material containing coarse particles was obtained. No that compositions of the obtained composite hydroxide and the obtained positive electrode active material were the same as those of Example 7.

TABLE 2

| | Additive element M | Ammonia concentration [g/L] | Temperature inside vessel [° C.] | pH in nucleation | pH in particle growth | Timing of atmosphere switching [%] | Average particle diameter [μm] | $(d_{90}-d_{10})$/average-particle-diameter | Thickness of outer shell portion [%] |
|---|---|---|---|---|---|---|---|---|---|
| Example 7 | — | 10 | 40 | 12.8 | 11.6 | 12.5 | 5.8 | 0.46 | 14 |
| Example 8 | — | 10 | 40 | 12.8 | 11.6 | 12.5 | 5.8 | 0.46 | 12 |
| Example 9 | — | 10 | 40 | 12.8 | 11.6 | 6.25 | 5.1 | 0.45 | 13 |
| Example 10 | W | 10 | 40 | 12.8 | 11.6 | 12.5 | 5.5 | 0.47 | 11 |
| Example 11 | — | 10 | 40 | 12.8 | 11.6 | 12.5 | 5.6 | 0.47 | 12 |
| Example 12 | — | 15 | 50 | 12.8 | 11.6 | 12.5 | 6.5 | 0.50 | 12 |
| Example 13 | — | 10 | 40 | 12.8 | 11.6 | 25 | 6.4 | 0.51 | 8 |
| Example 14 | W | 10 | 40 | 12.8 | 11.6 | 0 | 4.5 | 0.48 | 34 |
| Example 15 | — | 10 | 40 | 12.8 | 11.6 | 0 | 4.0 | 0.49 | 31 |
| Comparative Example 10 | — | 10 | 40 | 11.0 (continuous crystallization) | | — | 10.6 | 0.70 | Solid-core structure |
| Comparative Example 11 | — | 10 | 40 | 11.6 | 11.6 | — | 9.1 | 0.67 | Solid-core structure |
| Comparative Example 12 | — | 10 | 40 | 12.6 | 12.6 | — | — | — | — |
| Comparative Example 13 | — | 10 | 40 | 12.8 | 11.6 | 12.5 | 5.4 | 0.46 | 12 |
| Comparative Example 14 | — | 10 | 40 | 12.8 | 11.6 | 50 | 5.3 | 0.48 | 4 |

TABLE 3

| | Li/Me | Burning temperature [° C.] | Composition | Average particle diameter [μm] | $(d_{90}-d_{10})$/average-particle-diameter | Thickness of outer shell portion [%] | Specific surface area [m²/g] | Initial discharge capacity [mAh/g] | Positive electrode resistance [Ω] | capacity maintenance rate after 200 cycles [%] |
|---|---|---|---|---|---|---|---|---|---|---|
| Example 7 | 1.50 | 950 | $Li_{1.5}[Ni_{0.167}Co_{0.167}Mn_{0.666}]O_{2.5}$ | 5.3 | 0.46 | 13 | 1.5 | 272 | 37 | 80 |
| Example 8 | 1.70 | 850 | $Li_{1.7}[Ni_{0.167}Co_{0.167}Mn_{0.666}]O_{2.7}$ | 5.3 | 0.46 | 11 | 1.7 | 274 | 39 | 79 |
| Example 9 | 1.50 | 950 | $Li_{1.5}[Ni_{0.167}Co_{0.167}Mn_{0.666}]O_{2.5}$ | 4.7 | 0.46 | 14 | 1.3 | 267 | 38 | 79 |
| Example 10 | 1.50 | 950 | $Li_{1.5}[Ni_{0.167}Co_{0.167}Mn_{0.662}W_{0.005}]O_{2.5}$ | 5.0 | 0.48 | 11 | 1.3 | 269 | 29 | 84 |
| Example 11 | 1.25 | 950 | $Li_{1.25}[Ni_{0.167}Co_{0.167}Mn_{0.666}]O_{2.25}$ | 5.2 | 0.46 | 10 | 1.6 | 260 | 32 | 83 |
| Example 12 | 1.50 | 950 | $Li_{1.5}[Ni_{0.167}Co_{0.167}Mn_{0.666}]O_{2.5}$ | 5.9 | 0.52 | 12 | 1.5 | 268 | 38 | 80 |
| Example 13 | 1.50 | 950 | $Li_{1.5}[Ni_{0.167}Co_{0.167}Mn_{0.666}]O_{2.5}$ | 5.0 | 0.55 | 10 | 1.8 | 267 | 37 | 81 |
| Example 14 | 1.50 | 950 | $Li_{1.5}[Ni_{0.167}Co_{0.167}Mn_{0.662}W_{0.005}]O_{2.5}$ | 4.7 | 0.49 | 34 | 1.6 | 267 | 26 | 86 |
| Example 15 | 1.50 | 950 | $Li_{1.5}[Ni_{0.167}Co_{0.167}Mn_{0.666}W_{0.005}]O_{2.5}$ | 4.3 | 0.49 | 33 | 1.4 | 261 | 30 | 80 |
| Comparative Example 10 | 1.50 | 950 | $Li_{1.5}[Ni_{0.167}Co_{0.167}Mn_{0.666}]O_{2.5}$ | 10.4 | 0.73 | Solid-core structure | 1.4 | 270 | 71 | 70 |
| Comparative Example 11 | 1.50 | 950 | $Li_{1.5}[Ni_{0.167}Co_{0.167}Mn_{0.666}]O_{2.5}$ | 8.5 | 0.68 | Solid-core structure | 1.5 | 268 | 57 | 73 |
| Comparative Example 12 | — | — | — | — | — | — | — | — | — | — |
| Comparative Example 13 | 1.50 | 1100 | $Li[Ni_{0.167}Co_{0.167}Mn_{0.666}]O_{2.5}$ | 12.5 | 0.70 | 10 | 0.8 | 219 | 84 | — |
| Comparative Example 14 | 1.50 | 950 | $Li_{1.5}[Ni_{0.167}Co_{0.167}Mn_{0.666}]O_{2.5}$ | 8.5 | 0.75 | 6 | 1.9 | 226 | 49 | — |

(Evaluation)

The composite hydroxide particles and the positive electrode active materials of Examples 7 to 15 were produced according to the present invention, thereby each having a preferable value of [(d90–d10)/average-particle-diameter], which is an index indicating a scale of particle-size distribution, and having a good particle-diameter distribution and thus being of approximately equal particle diameter. Also, each of the positive electrode active materials has a structure comprising an outer shell portion in which aggregated primary particles are sintered and a hollow portion which is present inside the outer shell portion. A coin type battery comprising these positive electrode active materials has a high initial discharge capacity, an excellent cycle characteristic, and a low positive electrode resistance, and thus has excellent characteristics.

In Comparative Example 10, a continuous crystallization method was used, whereby the nucleation cannot be separated from the particle growth and the particle growth time is no constant, and accordingly a particle size distribution is wider. Therefore, a coin type battery, although having a high initial discharge capacity, has a worse cycle characteristic.

In Comparative Example 11, pH values in the nuclear growth and the particle growth each were not more than 12, whereby an amount of nuclei formed was insufficient and both composite hydroxide particles and a positive electrode active material have a large particle diameter. Thus, a coin type battery comprising the positive electrode active material has a insufficient reaction surface area, thereby having a higher positive electrode resistance than in Examples.

In Comparative Example 12, pH values in the nuclear growth and the particle growth each were not less than 12, whereby a new nucleus was formed during the whole period of the crystallization reaction and particles became finer and aggregated, and accordingly a particle size distribution was wider and a positive electrode active material was difficult to be produced.

In Comparative Example 13, a burning temperature was too high, whereby a specific surface area was smaller, and accordingly an initial discharge capacity was reduced, and besides, a positive electrode resistance was increased.

In Comparative Example 14, a treatment time in an air atmosphere in the particle growth process was longer, whereby a low density portion was too large, and coarse particles were formed when a positive electrode active material was produced, thereby making battery characteristics considerably worse. A cycle characteristic was not measured since a discharge characteristic was low.

The above-mentioned results indicate that, when manganese composite hydroxide particles and a positive electrode active material are manufactured using the production method according to the present invention, a nonaqueous electrolyte secondary battery comprising this positive electrode active material has a high initial discharge capacity, an excellent cycle characteristic, and a low positive electrode resistance, and thus has excellent characteristics.

Example 16

An amount of nuclei formed in the coprecipitation process of Example 1 was adjusted, whereby manganese composite hydroxide particles which were precursors and have an average particle diameter of 6.4 μm and [(d90−d10)/average-particle-diameter] of 0.55 were obtained. Tungstic oxide whose amount was calculated and weighed so as to achieve 1.2 atom % with respect to a total number of atoms of nickel, cobalt, and manganese in the obtained compound hydroxide was mixed, using a spartan mixer, with lithium carbonate whose amount was obtained by calculating and weighing a total amount of an amount to achieve a ratio Li/Me of 1.5 and an amount necessary to convert tungstic oxide further added into lithium tungstate. The added tungstic oxide had an average particle diameter of 840 nm and a ratio of average particle diameter of tungstic oxide to manganese composite hydroxide particles (tungstic oxide/manganese composite hydroxide particles) was 7.6.

Next, burning is performed in an air atmosphere at 950 degrees C. for 10 hours, whereby desired lithium metal composite oxide was obtained. From a TEM (transmission electron microscope) observation image, it was found that a layer thickness of a compound layer obtained this time and composed of tungsten and lithium was 6 to 11 nm.

(Production and Evaluation of Battery)

A 2032 type coin battery 1 produced in the same manner as in Example 1 (hereinafter, referred to as a coin type battery) was used for evaluation of a positive electrode active material.

An initial discharge capacity and a positive electrode resistance, which indicate performance of the produced coin type battery, were evaluated as follows.

The initial discharge capacity was obtained in such a manner that a coin type battery was left to stand for approximately 24 hours after the production thereof, and after an OCV (open circuit voltage) was stabilized, with setting a current density for a positive electrode at 0.1 mA/cm², charging was performed until the voltage reached a cut-off voltage of 4.8 V, and then, after a 1-hour suspension, discharging was performed until the voltage reached a cut-off voltage of 2.5 V, and a discharge capacity at this point was considered as the initial discharge capacity.

The resistance was measured in such a manner that, after electric potential was adjusted to be 4.0 V by performing constant-current, low-voltage charge, a 1.3-mA current was flown for 10 seconds, and then ΔV was calculated by subtracting an electric potential after the 10 seconds passed from 4.0 V, and divided by 1.3 mA, which is a current value passing the ΔV, whereby a resistance (Ω) was calculated.

A battery evaluation was performed, and as a result, as shown in Table 4, the initial discharge capacity was 268.5 mAh/g, and, as for the resistance in 3C by DC-IR, a relative value with respect to that in Example 20 was calculated as a resistance reduction rate, and as a result, was 36%.

Table 4 shows a W addition condition in the present Example, characteristics of the obtained positive electrode active material, and each evaluation of a coin type battery produced using this positive electrode active material. Furthermore, also as for Examples 17 to 19 and Comparative Examples 15 to 18 mentioned later, the same contents are shown in Table 4.

Example 17

A lithium metal composite oxide was produced and evaluated in the same manner as in Example 16, except that the amount of tungstic oxide added was changed from 1.2 atom % to 2.5 atom %. As a result, as shown in Table 4, the lithium metal composite oxide had a layer thickness of 13 to 17 nm, an initial discharge capacity was 265.2 mAh/g, and a resistance reduction rate was 31%.

Example 18

A lithium metal composite oxide was produced and evaluated in the same manner as in Example 16, except that 0.7 atom % of tungstic oxide having an average particle diameter of 370 nm and thus an average particle diameter ratio of 17 was added. As a result, as shown in Table 4, the lithium metal composite oxide had a layer thickness of 2 to 6 nm, an initial discharge capacity was 270.1 mAh/g, and a resistance reduction rate was 33%.

Example 19

A lithium metal composite oxide was produced and evaluated in the same manner as in Example 16, except that 2.3 atom % of tungstic oxide having an average particle diameter of 1.1 μm and thus an average particle diameter ratio of 5.7 was added. As a result, as shown in Table 4, the lithium metal composite oxide had a layer thickness of 11 to 19 nm, an initial discharge capacity was 263.0 mAh/g, and a resistance reduction rate was 29%.

Example 20

A lithium metal composite oxide was produced and evaluated in the same manner as in Example 16, except that tungstic oxide was not added. As a result, as shown in Table 4, an initial discharge capacity was 272.8 mAh/g.

Example 21

A lithium metal composite oxide was produced and evaluated in the same manner as in Example 16, except that the amount of tungstic oxide added was changed from 1.2 atom % to 4.7 atom %. As a result, as shown in Table 4, the lithium metal composite oxide had a layer thickness of 16 to 34 nm, an initial discharge capacity was 254.1 mAh/g, and a resistance reduction rate was 6%.

Example 22

A lithium metal composite oxide was produced and evaluated in the same manner as in Example 16, except that the amount of tungstic oxide added was changed from 1.2 atom % to 0.05 atom %. As a result, as shown in Table 4, the lithium metal composite oxide had a layer thickness of 0 to 3 nm, which means that a large portion thereof was not coated; an initial discharge capacity was 271.0 mAh/g; and a resistance reduction rate was 2%.

TABLE 4

| | W addition amount [atom %] | Average particle diameter ratio | Layer thickness [nm] | Initial discharge capacity [mAh/g] | Resistance reduction rate [%] |
|---|---|---|---|---|---|
| Example 16 | 1.2 | 7.6 | 6-11 | 268.5 | 36 |
| Example 17 | 2.5 | 7.6 | 13-17 | 265.2 | 31 |
| Example 18 | 0.7 | 17 | 2-6 | 270.1 | 33 |
| Example 19 | 2.3 | 5.7 | 11-19 | 263.0 | 29 |
| Example 20 | 0 | — | — | 272.8 | 0 |
| Example 21 | 4.7 | 7.6 | 16-34 | 254.1 | 6 |
| Example 22 | 0.05 | 7.6 | 0-3 | 271.0 | 2 |

INDUSTRIAL APPLICABILITY

The nonagneous electrolyte secondary battery according to the present invention has excellent electrical characteristics with a high capacity, and therefore is suitable as a small power-supply unit used for recent cell phones, portable electronic equipment such as notebook-sized personal computers, and the like, each of which requires a high energy density.

Furthermore, the nonaqueous secondary battery according to the present invention is excellent in safety, and therefore can be suitably applied as a large power-supply unit used for electric vehicles driven purely with electric energy, and hybrid vehicles or plug-in hybrid vehicles, in which a combustion engine, such as a gasoline engine or a diesel engine, is used in combination.

The invention claimed is:

1. A positive electrode active material for nonaqueous electrolyte secondary batteries, the positive electrode active material comprising:
   lithium metal composite oxide represented by a general formula: $Li_{1+s}Ni_xCo_yMn_zM_tO_{2+\alpha}$ wherein, $0.40 \leq s < 0.60$, $z-x \leq s$ when $z-x > 0.4$, $s \leq z$ when $z < 0.6$, $0 \leq x \leq 0.5$, $0 \leq y \leq 0.5$, $0.5 \leq z < 0.8$, $0 < x+y$, $x+y+z+t=1$, $z-x < 0.6$, and $0.4 \leq \alpha < 0.6$ and M is an additive element and is at least one element selected from Mg, Ca, Al, Ti, V, Cr, Zr, Nb, Mo, and W) and composed of hexagonal lithium-containing composite oxide having a layered structure,
   wherein the lithium metal composite oxide includes:
   primary particles,
   secondary particles composed of aggregation of the primary particles, each of the secondary particles having a hollow structure including an outer shell portion with the aggregated primary particles sintered and a hollow portion being inside the outer shell portion, the outer shell portion having a thickness at a ratio of 5 to 45% with respect to a particle diameter of the secondary particle and in a range of 0.5 to 2.5 μm,
   voids defined in a vicinity of a surface of the secondary particle and inside of the secondary particle, the voids defining regions where an electrolyte solution is capable of permeating, and
   a compound layer having a layer thickness of not more than 20 nm and composed of fine particles containing lithium and condensed tungsten, the compound layer being disposed: on surfaces of the primary particles exposed on an external surface of the secondary particle of the lithium metal composite oxide, on surfaces of the primary particles exposed at the voids in a vicinity of a surface of the secondary particle and inside the secondary particle where an electrolyte solution is capable of permeating via an exterior of the secondary particle, and at a particle boundary between the primary particles,
   the positive electrode active material has an average particle diameter of 3 to 12 μm and $[(d_{90}-d_{10})$/average-particle-diameter], and an index indicating a scale of particle-size distribution, of not more than 0.60.

2. The positive electrode active material for nonaqueous electrolyte secondary batteries according to claim 1,
   wherein, when the general formula in claim 1 is expressed as $sLi_2MnM^1_{t1}O_3 \cdot (1-s)LiNM^2_{t2}O_2$ (wherein, N is at least one selected from Ni, Co, and Mn, but always includes Ni or Co, and each of $M^1$ and $M^2$ is an additive element and is at least one element selected from Mg, Ca, Al, Ti, V, Cr, Zr, Nb, Mo and W), a ratio of $Li_2MnO_3:LiNO_2$ is 0.40:0.60 to 0.55:0.45; wherein $0.4 \leq u \leq 0.55$.

3. The positive electrode active material for nonaqueous electrolyte secondary batteries according to claim 2,
   wherein a ratio of Ni:Mn (Ni/Mn) contained in the $LiNO_2$ is from 0.8 to 1.2.

4. The positive electrode active material for nonaqueous electrolyte secondary batteries according to claim 1,
   wherein an amount of tungsten contained in the compound layer is 0.1 to 3.0 atom % with respect to a total number of atoms of metal elements, other than lithium, contained in the lithium metal composite oxide.

5. The positive electrode active material for nonaqueous electrolyte secondary batteries according to claim 1,
   wherein the positive electrode active material comprising the lithium metal composite oxide has an average particle diameter of 3 to 8 μm.

6. The positive electrode active material for nonaqueous electrolyte secondary batteries according to claim 1,
   the positive electrode active material having an initial discharge capacity of not less than 220 mAh/g when used for a 2032 type coin battery as a positive electrode active material.

7. A nonaqueous electrolyte secondary battery, comprising a positive electrode including the positive electrode active material for nonaqueous electrolyte secondary batteries according to claim 1 as an active material.

8. A positive electrode active material for nonaqueous electrolyte secondary batteries, the positive electrode active material comprising
   lithium metal composite oxide represented by a general formula: $Li_{1+u}Ni_xCo_yMn_zM_tO_{2+\alpha}$ (wherein, $0.05 \leq u \leq 0.95$, $x+y+z+t=1$, $0 \leq x \leq 0.5$, $0 \leq y \leq 0.5$, $0.5 \leq z < 0.8$, $0 \leq t \leq 0.1$, $0.05 \leq \alpha < 0.80$, and M is an additive element and is at least one element selected from Mg, Ca, Al, Ti, V, Cr, Zr, Nb, Mo, and W) and composed of hexagonal lithium-containing composite oxide having a layered structure, wherein the lithium metal composite oxide includes:

primary particles, secondary particles composed of aggregation of the primary particles, each of the secondary particles having a hollow structure including an outer shell portion with the aggregated primary particles sintered and a hollow portion being inside the outer shell portion, the outer shell portion having a thickness at a ratio of 5 to 45% with respect to a particle diameter of the secondary particle and in a range of 0.5 to 2.5 µm, and voids in a vicinity of a surface of the secondary particle and inside of the secondary particle, the voids defining regions where an electrolyte solution is capable of permeating, and wherein surfaces of the primary particles and the secondary particles, including surfaces facing out on the secondary particles, surfaces facing into the hollow portion and surfaces of the primary particles facing into the voids are coated by a compound layer having a layer thickness of not more than 20 nm and composed of fine particles of a lithium tungstate, and the positive electrode active material has an average particle diameter of 3 to 12 µm and $[(d_{90}-d_{10})/\text{average-particle-diameter}]$, and an index indicating a scale of particle-size distribution, of not more than 0.60.

9. The positive electrode active material for nonaqueous electrolyte secondary batteries according to claim 8, wherein the positive electrode active material comprising the lithium metal composite oxide has an average particle diameter of 3 to 8 µm.

* * * * *